(12) United States Patent
Seo et al.

(10) Patent No.: US 12,269,113 B2
(45) Date of Patent: Apr. 8, 2025

(54) JOINING METHOD

(71) Applicant: NIPPON LIGHT METAL COMPANY, LTD., Tokyo (JP)

(72) Inventors: Nobushiro Seo, Shizuoka (JP); Keita Oikawa, Shizuoka (JP); Ryo Yoshida, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 164 days.

(21) Appl. No.: 17/602,945

(22) PCT Filed: Dec. 24, 2019

(86) PCT No.: PCT/JP2019/050708
§ 371 (c)(1),
(2) Date: Oct. 11, 2021

(87) PCT Pub. No.: WO2020/208879
PCT Pub. Date: Oct. 15, 2020

(65) Prior Publication Data
US 2022/0161354 A1    May 26, 2022

(30) Foreign Application Priority Data

Apr. 12, 2019  (JP) ................................ 2019-076104
May 31, 2019  (JP) ................................ 2019-102468

(51) Int. Cl.
*B23K 20/00*  (2006.01)
*B23K 20/12*  (2006.01)
*B23K 103/10*  (2006.01)

(52) U.S. Cl.
CPC ........ *B23K 20/128* (2013.01); *B23K 20/1255* (2013.01); *B23K 2103/10* (2018.08)

(58) Field of Classification Search
CPC ............ B23K 20/1255; B23K 20/1215; B23K 20/1265; B23K 20/1225; B23K 20/125; B23K 20/122
See application file for complete search history.

(56) References Cited

U.S. PATENT DOCUMENTS 10,906,127 B2 *  2/2021  Seo ..................... B23K 20/1265
11,229,972 B2 *  1/2022  Masaki ............. B23K 20/2336
(Continued)

FOREIGN PATENT DOCUMENTS

CN    108430687 A    8/2018
JP    2000-94159 A   4/2000
(Continued)

OTHER PUBLICATIONS

Office Action for Korean Patent Application No. 10-2021-7019624 (dated Oct. 26, 2022).
(Continued)

*Primary Examiner* — Erin B Saad
(74) *Attorney, Agent, or Firm* — Merchant & Gould P.C.

(57) ABSTRACT

The present invention includes a joining process in which a first metal member and a second metal member are joined with an auxiliary member interposed therebetween by moving a rotary tool along a butted portion in a state where the rotary tool being rotated is inserted only from a front face side of the auxiliary member, only a stirring pin is in contact with the auxiliary member, a base end side of the stirring pin is exposed, and an outer circumferential face of the stirring pin is slightly in contact with the first metal member and the second metal member, and the auxiliary member is provided with an inclined face on at least one side face in such a form that the auxiliary member has a smaller dimension with increasing distance from a front face, and at least one of the first metal member and the second metal member is provided with an inclined face corresponding to the inclined
(Continued)

face of the auxiliary member and inclined from the front face toward a back face.

2 Claims, 22 Drawing Sheets

(56) References Cited

U.S. PATENT DOCUMENTS

| | | | |
|---|---|---|---|
| 11,241,756 B2* | 2/2022 | Hori | B23K 33/00 |
| 11,305,374 B2* | 4/2022 | Luszczak | F02F 1/10 |
| 11,389,892 B2* | 7/2022 | Hori | B23K 20/129 |
| 2003/0024965 A1 | 2/2003 | Okamura et al. | |
| 2003/0075584 A1 | 4/2003 | Sarik et al. | |
| 2012/0193401 A1* | 8/2012 | Hori | B23K 20/1265 228/2.1 |
| 2017/0001257 A1* | 1/2017 | Seo | B23K 20/1265 |
| 2018/0043465 A1 | 2/2018 | Hori | |
| 2021/0146473 A1* | 5/2021 | Hori | B23K 20/129 |
| 2021/0213561 A1* | 7/2021 | Hori | B23K 20/1255 |
| 2022/0347788 A1* | 11/2022 | Hori | B23K 20/1245 |

FOREIGN PATENT DOCUMENTS

| | | |
|---|---|---|
| JP | 2000-317652 A | 11/2000 |
| JP | 2003-39183 A | 2/2003 |
| JP | 2007-83242 A | 4/2007 |
| JP | 2015-213928 A | 12/2015 |
| JP | 2018-8306 A | 1/2018 |
| WO | 2016/132768 A1 | 8/2016 |

OTHER PUBLICATIONS

International Search Report for No. PCT/JP2019/050708 dated Feb. 10, 2020.

Office Action for Chinese Patent Application No. 201980093312.2 (dated May 7, 2022).

Office Action for Chinese Patent Application No. 201980093312.2 (dated Oct. 8, 2022).

* cited by examiner

JOINING METHOD

This application is a National Stage Application of PCT/JP2019/050708, filed Dec. 24, 2019, which claims benefit of priority to Japanese Patent Application No. 2019-076104, filed Apr. 12, 2019, Japanese Patent Application No. 2019-102468, filed May 31, 2019, and which applications are incorporated herein by reference. To the extent appropriate, a claim of priority is made to each of the above disclosed applications.

TECHNICAL FIELD

The present invention relates to a joining method.

BACKGROUND ART

For example, a patent literature 1 discloses an invention in which friction stir welding is performed to a pair of plate-like metal members with use of a rotary tool. This invention is an invention in which an auxiliary member, which is softer than the metal members, is inserted between the pair of metal members and friction stirring is performed by inserting the rotary tool into the auxiliary member. In a case where harder metal members are joined to each other by performing friction stirring, there is a problem that the rotary tool is severely damaged to increase the cost of the tool. However, according to this invention, since friction stirring is performed by inserting the rotary tool into the softer auxiliary member, harder metal members can be suitably joined to each other.

CITATION LIST

Patent Literature

Patent Literature 1: JP 2007-83242, A

SUMMARY OF INVENTION

Technical Problem

In the conventional joining method, since the stirring pin of the rotary tool has a column shape, there is a problem that it is hard to insert it into the auxiliary member. Furthermore, since the friction stirring is performed in a state where the shoulder portion of the rotary tool is brought into contact with the metal members, there is a problem that the load acting on the friction stir device is enlarged.

From such a view point, it is an object of the present invention to provide a joining method by which harder metal members can be suitably joined to each other.

Solution to Problem

In order to solve the problem, the present invention is characterized by a joining method by which a pair of metal members are joined to each other with use of a rotary tool provided with a stirring pin having a smaller diameter toward a tip thereof, the method including: a preparation process in which a first metal member made of an aluminum alloy, a second metal member made of an aluminum alloy, and an auxiliary member made of aluminum or an aluminum alloy having a hardness lower than those of the first metal member and the second metal member are prepared; a butting process in which a butted portion is formed in such a form that an end portion of the first metal member and an end portion of the second metal member face each other, the auxiliary member is interposed in a gap formed between the end portions, the end face of the first metal member is butted against one side face of the auxiliary member, and an end face of the second metal member is butted against the other side face of the auxiliary member; and a joining process in which the first metal member and the second metal member are joined with the auxiliary member interposed therebetween by moving the rotary tool along the butted portion in a state where the rotary tool which is being rotated is inserted only from a front face side of the auxiliary member, only the stirring pin is in contact with the auxiliary member, a base end side of the stirring pin is exposed, and an outer circumferential face of the stirring pin is slightly in contact with the first metal member and the second metal member, wherein the auxiliary member is provided with an inclined face on at least one of the one side face and the other face thereof in such a form that the auxiliary member has a smaller dimension with increasing distance from the front face thereof, and at least one of the first metal member and the second metal member is provided with an inclined face which corresponds to the inclined face of the auxiliary member and is inclined from a front face toward a back face.

Furthermore, the present invention is characterized by a joining method by which a pair of metal members are joined to each other with use of a rotary tool provided with a stirring pin having a smaller diameter toward a tip thereof, the method including: a preparation process in which a first metal member made of an aluminum alloy and provided with an inclined face on an end portion thereof, a second metal member made of an aluminum alloy and provided with an inclined face on an end portion thereof, and an auxiliary member made of aluminum or an aluminum alloy having a hardness lower than those of the first metal member and the second metal member and provided with inclined faces on both side faces in such a form that the auxiliary member has a smaller dimension with increasing distance from a front face toward a tip thereof are prepared; a butting process in which a butted portion is formed in such a form that the end portion of the first metal member and the end portion of the second metal member face each other, the auxiliary member is interposed in a gap formed between the end portions, the inclined face of the first metal member is butted against one inclined face of the auxiliary member, and the inclined face of the second metal member is butted against the other inclined face of the auxiliary member; and a joining process in which the first metal member and the second metal member are joined with the auxiliary member interposed therebetween by moving the rotary tool along the butted portion in a state where the rotary tool which is being rotated is inserted only from the front face side of the auxiliary member, only the stirring pin is in contact with the auxiliary member, a base end side of the stirring pin is exposed, and an outer circumferential face of the stirring pin is slightly in contact with the first metal member and the second metal member.

According to the joining method, since the rotary tool provided with a stirring pin having a smaller diameter toward the tip thereof is used, the rotary tool can be easily inserted into the auxiliary member. Further, since only the stirring pin is inserted into the auxiliary member, the load to act on the friction stir device can be reduced. And further, since the rotary tool is inserted into the auxiliary member softer than the first metal member and the second metal member, the life of the rotary tool can be lengthened. Furthermore, by bringing the stirring pin slightly into contact with the first metal member and the second metal member, the joining strength can be enhanced.

Further, it is preferable that the auxiliary member is provided on a back face side thereof with a protruding portion to prevent from being floated, and in the butting process, the first metal member and the second metal member are butted against each other in such a form that the protruding portion is engaged with at least one of the first metal member and the second metal member.

According to the joining method, the auxiliary member can be prevented from being floated toward the front side thereof, so that the joining can be more suitably performed.

Furthermore, the present invention is characterized by a joining method by which a pair of metal members are joined to each other with use of a rotary tool provided with a stirring pin having a smaller diameter toward a tip thereof, the method including: a preparation process in which a first metal member made of an aluminum alloy and provided with an inclined face on an end portion thereof, a second metal member made of an aluminum alloy, and an auxiliary member made of aluminum or an aluminum alloy having a hardness lower than those of the first metal member and the second metal member and provided with inclined faces on both side faces in such a form that the auxiliary member has a smaller dimension with increasing distance from a front face toward a tip thereof are prepared; a butting process in which a butted portion is formed in such a form that the end portion of the first metal member and a side face of the second metal member are butted against each other, the auxiliary member is interposed in a gap formed on an inner corner side between the end portion of the first metal member and the side face of the second metal member, the inclined face of the first metal member is butted against one inclined face of the auxiliary member, and the side face of the second metal member is butted against the other inclined face of the auxiliary member; and a joining process in which the first metal member and the second metal member are joined with the auxiliary member interposed therebetween by moving the rotary tool along the butted portion in a state where the rotary tool which is being rotated is inserted only from a front face side of the auxiliary member, only the stirring pin is in contact with the auxiliary member, a base end side of the stirring pin is exposed, and an outer circumferential face of the stirring pin is slightly in contact with the first metal member and the second metal member.

According to the joining method, since the rotary tool provided with a stirring pin having a smaller diameter toward the tip thereof is used, the rotary tool can be easily inserted into the auxiliary member. Further, since only the stirring pin is inserted into the auxiliary member, the load to act on the friction stir device can be reduced. And further, since the rotary tool is inserted into the auxiliary member softer than the first metal member and the second metal member, the life of the rotary tool can be lengthened. Furthermore, by bringing the stirring pin slightly into contact with the first metal member and the second metal member, the joining strength can be enhanced. And further, the first metal member and the second metal member can be joined orthogonally to each other.

Further, it is preferable that the auxiliary member is provided on a back face side thereof with a protruding portion to prevent from being floated, and in the butting process, the first metal member and the second metal member are butted against each other in such a form that the protruding portion is engaged with at least one of the first metal member and the second metal member.

According to the joining method, the auxiliary member can be prevented from being floated toward the front side thereof, so that the joining can be more suitably performed.

Furthermore, the present invention is characterized by a joining method by which a pair of metal members are joined to each other with use of a rotary tool provided with a stirring pin having a smaller diameter toward a tip thereof, the method including: a preparation process in which a first metal member made of an aluminum alloy and provided with an inclined face on an end portion thereof, a second metal member made of an aluminum alloy, and an auxiliary member made of aluminum or an aluminum alloy having a hardness lower than those of the first metal member and the second metal member and provided with inclined faces on both side faces in such a form that the auxiliary member has a smaller dimension with increasing distance from a front face toward a tip thereof are prepared; a butting process in which a butted portion is formed in such a form that the first metal member and the second metal member are overlapped with each other, the auxiliary member is interposed in a gap formed between the inclined face of the first metal member and a front face of the second metal member, the inclined face of the first metal member is butted against one inclined face of the auxiliary member, and the front face of the second metal member is butted against the other inclined face of the auxiliary member; and a joining process in which the first metal member and the second metal member are joined with the auxiliary member interposed therebetween by moving the rotary tool along the butted portion in a state where the rotary tool which is being rotated is inserted only from a front face side of the auxiliary member, only the stirring pin is in contact with the auxiliary member, a base end side of the stirring pin is exposed, and an outer circumferential face of the stirring pin is slightly in contact with the first metal member and the second metal member.

According to the joining method, since the rotary tool provided with a stirring pin having a smaller diameter toward the tip thereof is used, the rotary tool can be easily inserted into the auxiliary member. Further, since only the stirring pin is inserted into the auxiliary member, the load to act on the friction stir device can be reduced. And further, since the rotary tool is inserted into the auxiliary member softer than the first metal member and the second metal member, the life of the rotary tool can be lengthened. Furthermore, by bringing the stirring pin slightly into contact with the first metal member and the second metal member, the joining strength can be enhanced. And further, the first metal member and the second metal member can be joined in a form of being overlapped with each other.

Further, it is preferable that the auxiliary member is provided on a back face side thereof with a protruding portion to prevent from being floated, and in the butting process, the first metal member and the second metal member are butted against each other in such a form that the protruding portion is fitted into a recessed groove formed of at least one of a groove portion formed on a back face of the first metal member and a groove portion formed on the front face of the second metal member.

According to the joining method, the auxiliary member can be prevented from being floated toward the front side thereof, so that the joining can be more suitably performed.

Furthermore, the present invention is characterized by a joining method by which a pair of metal members are joined to each other with use of a rotary tool provided with a stirring pin having a smaller diameter toward a tip thereof, the method including: a preparation process in which a first metal member made of an aluminum alloy, a second metal member made of an aluminum alloy, and an auxiliary member having a rectangular cross section and made of aluminum or an aluminum alloy having a hardness lower than those of the first metal member and the second metal member are prepared; a butting process in which a butted portion is formed in such a form that an end portion of the first metal member and an end portion of the second metal member face each other, the auxiliary member is interposed in a gap formed between the end portions, an end face of the first metal member is butted against one side face of the auxiliary member, and an end face of the second metal member is butted against the other side face of the auxiliary member; and a joining process in which the first metal member and the second metal member are joined with the auxiliary member interposed therebetween by moving the rotary tool along the butted portion in a state where the rotary tool which is being rotated is inserted from a front face side of the auxiliary member, only the stirring pin is in contact with the auxiliary member, a base end side of the stirring pin is exposed, and an outer circumferential face of at least a base end side of the stirring pin is in contact with the first metal member and the second metal member.

According to the joining method, since the rotary tool provided with a stirring pin having a smaller diameter toward the tip thereof is used, the rotary tool can be easily inserted into the auxiliary member. Further, since only the stirring pin is inserted into the auxiliary member, the load to act on the friction stir device can be reduced. And further, since the rotary tool is inserted into the auxiliary member softer than the first metal member and the second metal member, the life of the rotary tool can be lengthened. Furthermore, by bringing the stirring pin into contact with the first metal member and the second metal member, the joining strength can be enhanced.

Further, it is preferable that the auxiliary member is provided on a back face side thereof with a protruding portion to prevent from being floated, and in the butting process, the first metal member and the second metal member are butted against each other in such a form that the protruding portion is engaged with at least one of the first metal member and the second metal member.

According to the joining method, the auxiliary member can be prevented from being floated toward the front side thereof, so that the joining can be more suitably performed.

Furthermore, the present invention is characterized by a joining method by which a pair of metal members are joined to each other with use of a rotary tool provided with a stirring pin having a smaller diameter toward a tip thereof, the method including: a preparation process in which a first metal member made of an aluminum alloy, a second metal member made of an aluminum alloy, and an auxiliary member having a rectangular cross section and made of aluminum or an aluminum alloy having a hardness lower than those of the first metal member and the second metal member are prepared; a butting process in which a butted portion is formed in such a form that an end portion of the first metal member is butted against a side face of the second metal member, the auxiliary member is interposed in a gap formed between the end portion of the first metal member and the side face of the second metal member, an end face of the first metal member is butted against one side face of the auxiliary member, and the side face of the second metal member is butted against the other side face of the auxiliary member; and a joining process in which the first metal member and the second metal member are joined with the auxiliary member interposed therebetween by moving the rotary tool along the butted portion in a state where the rotary tool which is being rotated is inserted from a front face side of the auxiliary member, only the stirring pin is in contact with the auxiliary member, a base end side of the stirring pin is exposed, and an outer circumferential face of at least a base end side of the stirring pin is in contact with the first metal member and the second metal member.

According to the joining method, since the rotary tool provided with a stirring pin having a smaller diameter toward the tip thereof is used, the rotary tool can be easily inserted into the auxiliary member. Further, since only the stirring pin is inserted into the auxiliary member, the load to act on the friction stir device can be reduced. And further, since the rotary tool is inserted into the auxiliary member softer than the first metal member and the second metal member, the life of the rotary tool can be lengthened. Furthermore, by bringing the stirring pin into contact with the first metal member and the second metal member, the joining strength can be enhanced. And further, the first metal member and the second metal member can be joined orthogonally to each other.

Further, it is preferable that the auxiliary member is provided on a back face side thereof with a protruding portion to prevent from being floated, and in the butting process, the first metal member and the second metal member are butted against each other in such a form that the protruding portion is engaged with at least one of the first metal member and the second metal member.

According to the joining method, the auxiliary member can be prevented from being floated toward the front side thereof, so that the joining can be more suitably performed.

Advantageous Effects Of Invention

According to the joining method according to the present invention, harder metal members can be suitably joined to each other.

DESCRIPTION OF EMBODIMENTS

First Embodiment

Figure 1:
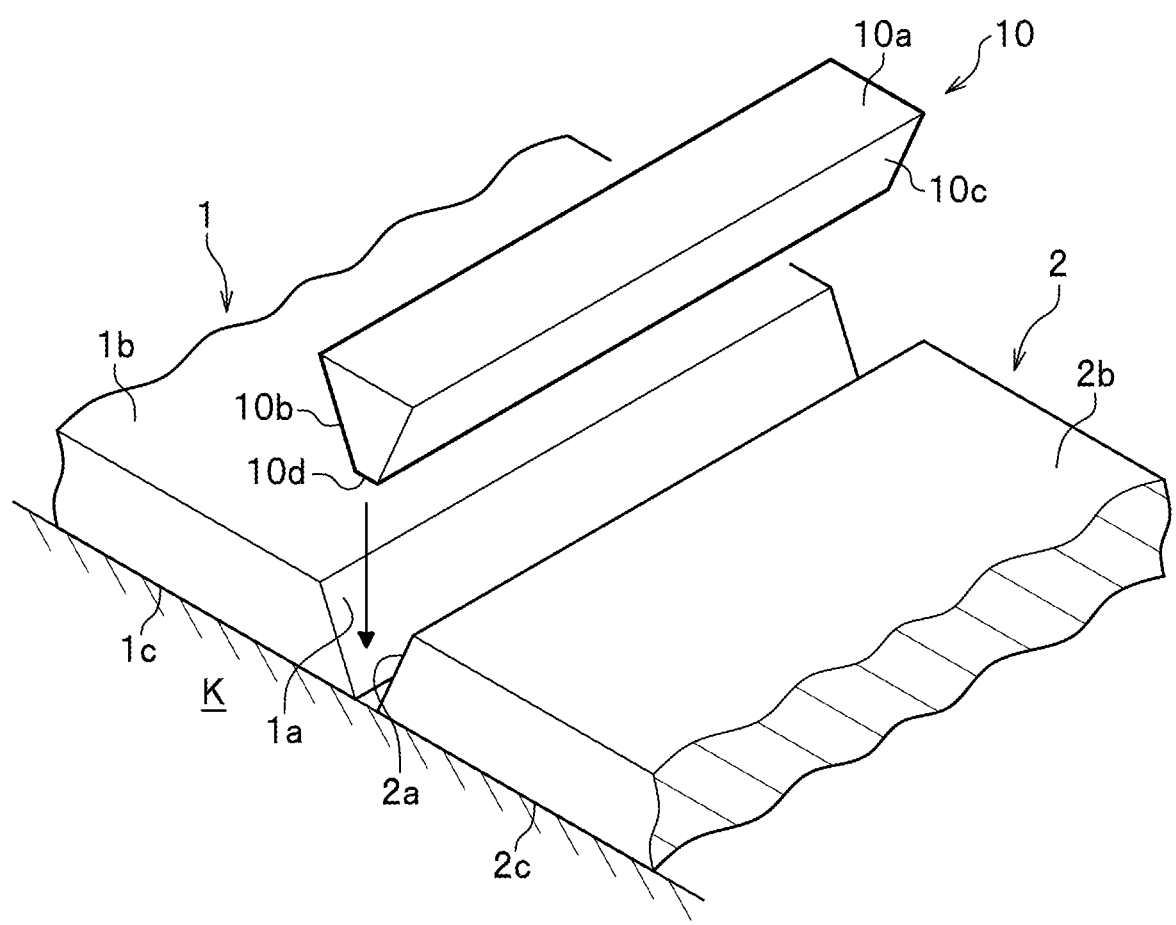
FIG. 1 is a perspective view showing a preparation process of a joining method according to a first embodiment of a present invention.

A first embodiment of the present invention will be described appropriately with reference to FIGS. In a joining method according to the first embodiment, a preparation process, a butting process, and a joining process are performed. As shown in FIG. 1, friction stir welding is performed to a first metal member 1 and a second metal member 2 in this embodiment. A "front face" described hereinafter means the opposite face to a "back face".

As shown in FIG. 1, the preparation process is a process in which the first metal member 1, the second metal member 2, and an auxiliary member 10 are prepared. Each of the first metal member 1 and the second metal member 2 is a plate-like metal member. Each of the first metal member 1 and the second metal member 2 is not specifically limited so long as it is made of metal which can be frictionally stirred. For example, each of the first metal member 1 and the second metal member 2 is made of aluminum or an aluminum alloy. In this embodiment, each of the first metal member 1 and the second metal member 2 is made of an aluminum alloy casting material such as JISH5302 ADC12 (based on Al—Si—Cu).

The first metal member 1 is provided with an end face 1a formed on an end portion thereof, a front face 1b, and a back face 1c. The second metal member 2 is provided with an end face 2a formed on an end portion thereof, a front face 2b, and a back face 2c. The plate thickness of each of the first metal member 1 and the second metal member 2 is the same as each other. The end face 1a and the end face 2a are inclined faces to incline so as to more separate from each other with approaching the front faces 1b, 2b, respectively. The inclination angles of the end face 1a and the end face 2a with respective to a vertical plane are the same as each other.

An auxiliary member 10 is a member to be interposed between the first metal member 1 and the second metal member 2. The auxiliary member 10 is made of a metal having a hardness lower than that of the first metal member 1. The auxiliary member 10 is made of, for example, an aluminum alloy expansible material such as JIS A1050, A1100, A6063. The auxiliary member 10 is an elongated member having a trapezoidal cross section.

The auxiliary member 10 is provided with a front face 10a, side faces 10b, 10c, and a back face 10d. The side faces 10b, 10c are inclined faces which approach closer each other with increasing distance from the front face 10a (toward the back face 10d). Inclined angles of the side faces 10b, 10c are the same as those of the end faces 1a, 2a which face the side faces 10b, 10c, respectively.

Figure 2:
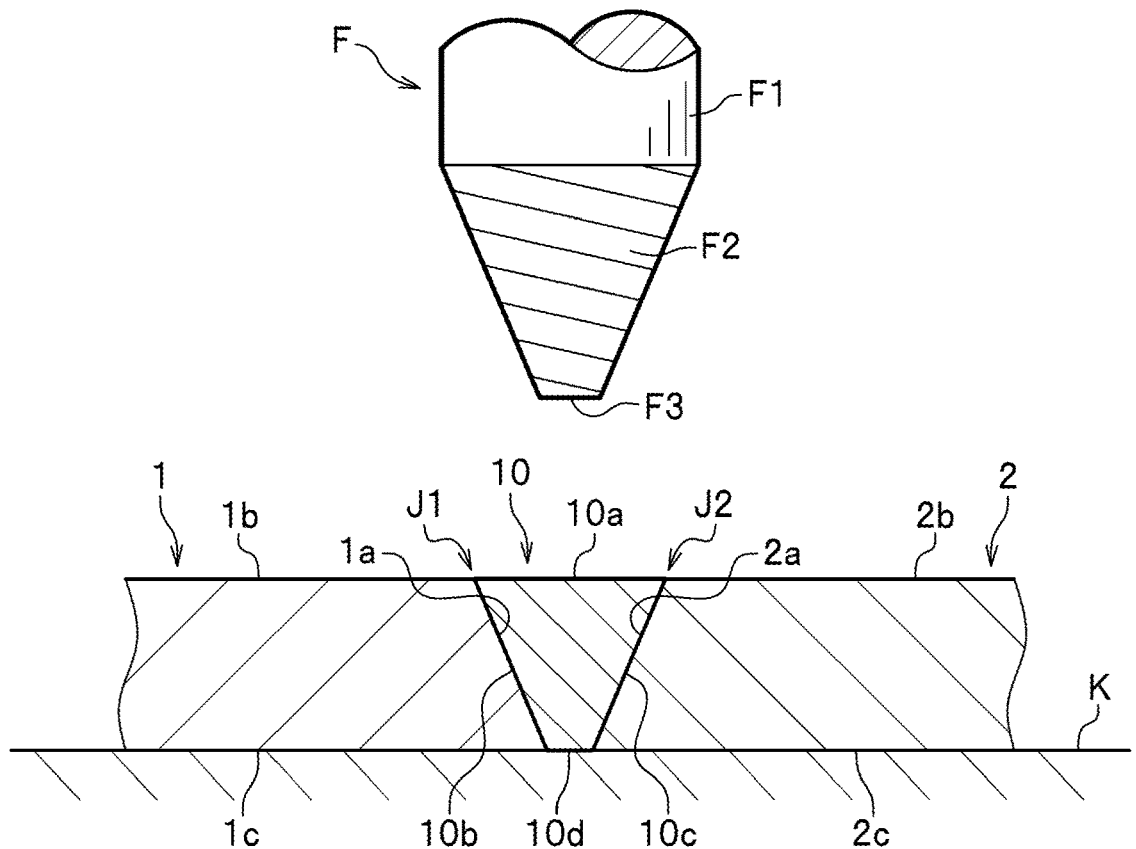
FIG. 2 is a cross sectional view showing a butting process of the joining method according to the first embodiment.

As shown in FIG. 2, the butting process is a process in which the first metal member 1, the second metal member 2, and the auxiliary member 10 are butted against one another and fixed to a base frame K. In the butting process, the auxiliary member 10 is disposed between the end face 1a of the first metal member 1 and the end face 2a of the second metal member 2. A butted portion J1 is formed by butting the end face 1a of the first metal member 1 against the side face 10b of the auxiliary member 10 in such a form that both faces 1a, 10b are approximately brought into face-to-face contact with each other. A butted portion J2 is formed by butting the end face 2a of the second metal member 2 against the side face 10c of the auxiliary member 10 in such a form that both faces 2a, 10c are approximately brought into face-to-face contact with each other. The front face 10a of the auxiliary member 10 is flush with the front face 1b of the first metal member 1 and the front face 2b of the second metal member 2. The back face 10d of the auxiliary member 10 is flush with the back face 1c of the first metal member 1 and the back face 2c of the second metal member 2.

Here, as shown in FIG. 2, a rotary tool F is composed of a base portion F1 and a stirring pin F2. The rotary tool F is made of, for example, a tool steel. The base portion F1 is a portion to be connected to a rotary shaft of a friction stir device. The stirring pin F2 hangs down from the base portion F1 and has a smaller diameter with increasing distance toward the tip thereof. The stirring pin F2 has a flat face F3 formed at the tip thereof, the flat face F3 being orthogonal to the rotational axis. The flat face F3 is formed to have a size slightly larger than the back face 10d of the auxiliary member 10.

A tapered angle of an outer circumferential face of the stirring pin F2 is the same as each tapered angle of the end face 1a of the first metal member 1 and the end face 2a of the second metal member 2. That is, the longitudinal sectional shape of the stirring pin F2 viewed from the side is substantially the same as that of the auxiliary member 10.

The stirring pin F2 has a spiral groove formed on the outer circumferential face thereof. In this embodiment, the spiral groove is formed to rotate counterclockwise from the base end side toward the tip side since the rotary tool F is rotated clockwise. Note that, in a case where the rotary tool F is rotated counterclockwise, the spiral groove is formed clockwise from the base end side toward the tip side. By adopting such a form, plastically fluidized metal is led through the spiral groove to move toward the tip side, so that the generation of burrs can be restrained.

Figure 3:
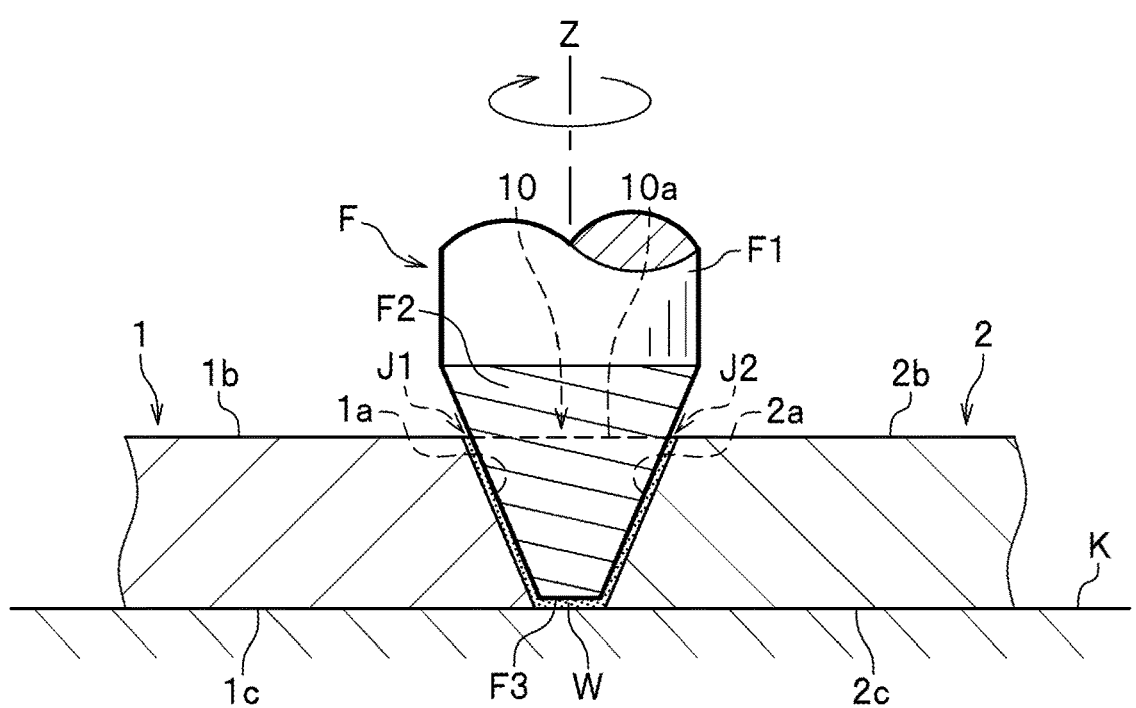
FIG. 3 is a cross sectional view showing a joining process of the joining method according to the first embodiment.

As shown in FIG. 3, the joining process is a process in which friction stir welding is performed to the first metal member 1 and the second metal member 2 with use of the rotary tool F. In the joining process, the stirring pin F2 of the rotary tool F which is being rotated clockwise is inserted into the front face 10a of the auxiliary member 10 in the middle in the width direction thereof.

In the joining process, the outer circumferential face of the stirring pin F2 does not have to be brought into contact with the end face 1a of the first metal member 1 and the end face 2a of the second metal member 2. However, in this embodiment, the rotary tool F is moved along the auxiliary member 10 in a state where the stirring pin F2 is slightly in contact with the end face 1a of the first metal member 1 and the end face 2a of the second metal member 2. The contact dimension between the outer circumferential face of the stirring pin F2 and the end face 1a of the first metal member 1 and the end face 2a of the second metal member 2 may be appropriately set to, for example, less than 1.0 mm.

In the joining process, friction stirring is performed in a state where only the stirring pin F2 is in contact with the first metal member 1, the second metal member 2, and the auxiliary member 10, and the base end side of the stirring pin F2 is exposed from the first metal member 1 and the second metal member 2. The flat face F3 of the stirring pin F2 is inserted into a deep position as far as it is not brought into contact with the base frame K. After the rotary tool F is moved along the auxiliary member 10 and reaches an end position, the rotary tool F is removed away from the auxiliary member 10. Through the above-described way, the butted portions J1, J2 are friction stir welded simultaneously by one process. A plasticized region W is formed along the moving track of the rotary tool F.

According to the joining method according to this embodiment described in the above, the rotary tool F provided with the stirring pin F2, which has a smaller diameter with approaching the tip thereof, is used, so that it can be easily inserted into the front face 10a of the auxiliary member 10. Furthermore, friction stirring is performed in the state where only the stirring pin F2 is inserted into the auxiliary member 10 and the base end side of the stirring pin F2 is exposed, so that the load to be acted on the friction stir device can be reduced.

Further, the rotary tool F is inserted into the auxiliary member 10 having a hardness lower than those of the first metal member 1 and the second metal member 2, so that the life of the rotary tool F can be prolonged. Furthermore, the stirring pin F2 is just slightly brought into contact with the first metal member 1 and the second metal member 2, so that a large amount of the harder metal of the first metal member 1 and the second metal member 2 can be prevented from mixing into the auxiliary member 10 side. Therefore, the joint strength can be more enhanced.

Since the end face 1a of the first metal member 1 and the end face 2a of the second metal member 2 are provided with the inclined faces, the stirring pin F2 can be prevented from largely coming into contact with the first metal member 1 and the second metal member 2. Furthermore, in this embodiment, since the tapered angle of the stirring pin F2 is set to be the same (almost parallel) as the inclined angles of the end faces 1a, 2a, friction stirring can be performed in a well-balanced manner in the height direction.

Second Embodiment

Figure 4:
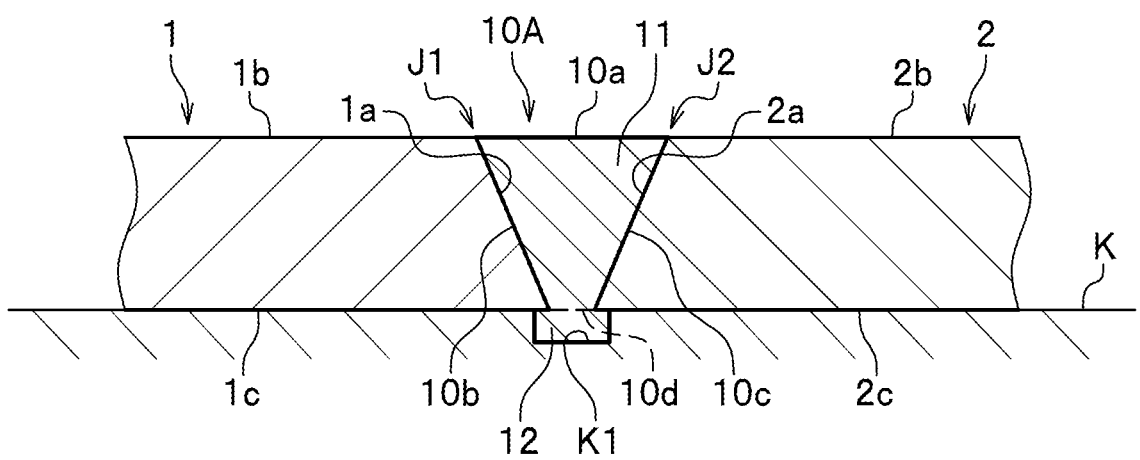
FIG. 4 is a cross sectional view showing a butting process of a joining method according to a second embodiment of the present invention.

Next, a joining method according to a second embodiment of the present invention will be described. FIG. 4 is a cross sectional view showing a butting process of the joining method according to the second embodiment of the present invention. In the joining method according to the second embodiment, a preparation process, the butting process, and a joining process are performed. In the second embodiment, a shape of an auxiliary member 10A mainly differs from that of the first embodiment. In this embodiment, matters different from those of the first embodiment will be mainly described.

As shown in FIG. 4, a first metal member 1 and a second metal member 2 are the same as those of the first embodiment. An auxiliary member 10A is provided with a body portion 11 having a trapezoidal cross section, and a protruding portion 12 protruding downward from a back face (bottom) 10d of the body portion 11. The protruding portion 12 has a rectangular cross section which is wider than the back face (bottom) 10d of the body portion 11. Further, the protruding portion 12 is formed to have a shape constant in the longitudinal direction of the auxiliary member 10A. A recessed portion K1 having a rectangular cross section, into which the protruding portion 12 is inserted, is formed on the base frame K.

In the butting process, the first metal member 1, the second metal member 2, and the auxiliary member 10A are butted against one another and fixed to the base frame K. In the butting process, at first, the protruding portion 12 of the auxiliary member 10A is inserted into the recessed portion K1. For example, the protruding portion 12 is inserted from an opening portion of the recessed portion K1 on the anterior side or the posterior side of the base frame K.

Next, the first metal member 1 and the second metal member 2 are butted against each other via the auxiliary member 10A from respective sides of the auxiliary member 10A. The protruding portion 12 is engaged with both the back face 1c of the first metal member 1 and the back face 2c of the second metal member 2. Abutted portion J1 is formed by butting the end face 1a of the first metal member 1 against a side face 10b of the auxiliary member 10. A butted portion J2 is formed by butting the end face 2a of the second metal member 2 against a side face 10c of the auxiliary member 10A.

In the joining process, friction stir welding is performed to the butted portions J1, J2 with use of the rotary tool F. In this embodiment, friction stir welding is performed in the same manner as that of the first embodiment. After the joining process is finished, a cutting process to cut the protruding portion 12 may be performed, or the protruding portion 12 may be left.

Also according to the second embodiment described in the above, almost the same effect as that of the first embodiment can be achieved. For example, the longer a joining length due to the friction stir welding is, the longer length the auxiliary member 10 is formed to have. In a case where friction stir welding is performed in such a case, there is a problem that the auxiliary member 10 is floated upward by performing friction stir welding. However, in the second embodiment, since the auxiliary member 10A is provided with the protruding portion 12, the auxiliary member 10A can be prevented from being floated upward. Hereby, the position of the auxiliary member 10A with respect to the first metal member 1 and the second metal member 2 is prevented from shifting, so that friction stir welding can be more suitably performed.

Note that, in this embodiment, the protruding portion 12 is set to be engaged with both of the first metal member 1 and the second metal member 2, but may be set to be engaged with at least one of the first metal member 1 and the second metal member 2 so that the auxiliary member 10A is not floated.

Third Embodiment

Figure 5:
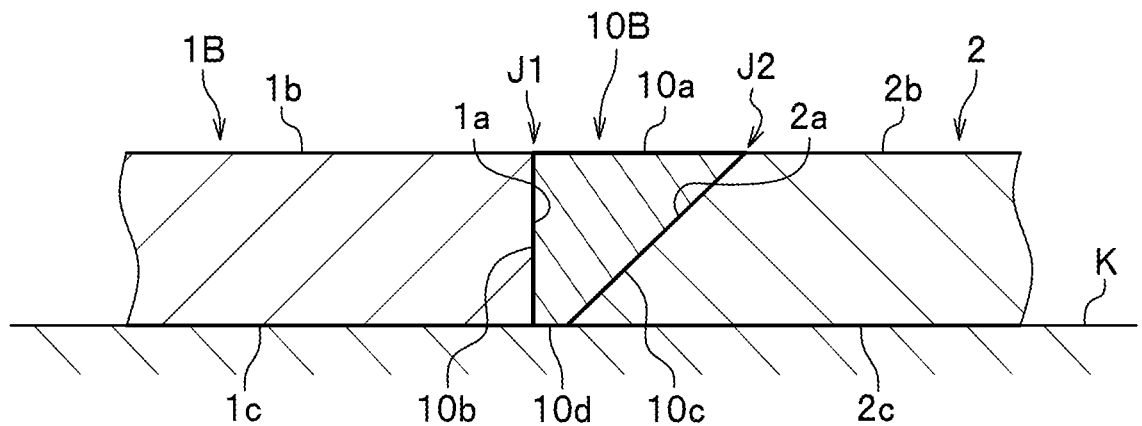
FIG. 5 is a cross sectional view showing a butting process of a joining method according to a third embodiment of the present invention.

Next, a joining method according to a third embodiment of the present invention will be described. FIG. 5 is a cross sectional view showing a butting process of the joining method according to the third embodiment of the present invention. In the joining method according to the third embodiment, a preparation process, the butting process, and a joining process are performed. In the third embodiment, a shape of an auxiliary member 10B mainly differs from that of the first embodiment. In this embodiment, matters different from those of the first embodiment will be mainly described.

In the preparation process, a first metal member 1B, a second metal member 2, and an auxiliary member 10B are prepared. An end face 1a of the first metal member 1B is formed to be orthogonal to a front face 1b and a back face 1c. The second metal member 2 is the same as that of the first embodiment. The auxiliary member 10B has a trapezoidal cross section and is provided with a front face 10a, side faces 10b, 10c, and a back face 10d.

The side face 10b is formed to be orthogonal to the front face 10a. The side face 10c is inclined in such a form that the auxiliary member 10B has smaller width with increasing distance from the front face 10a. The inclined angle of the side face 10c is the same as that of the end face 2a of the second metal member 2.

In the butting process, the first metal member 1B, the second metal member 2, and the auxiliary member 10B are butted against one another. Abutted portion J1 is formed by butting the side face 10b of the auxiliary member 10B against the end face 1a of the first metal member 1B. A butted portion J2 is formed by butting the side face 10c of the auxiliary member 10B against the end face 2a of the second metal member 2. The front face 10a of the auxiliary member 10 is flush with both the front face 1b of the first metal member 1B and the front face 2b of the second metal member 2. The back face 10d of the auxiliary member 10 is flush with both the back face 1c of the first metal member 1B and the back face 2c of the second metal member 2.

Figure 6:
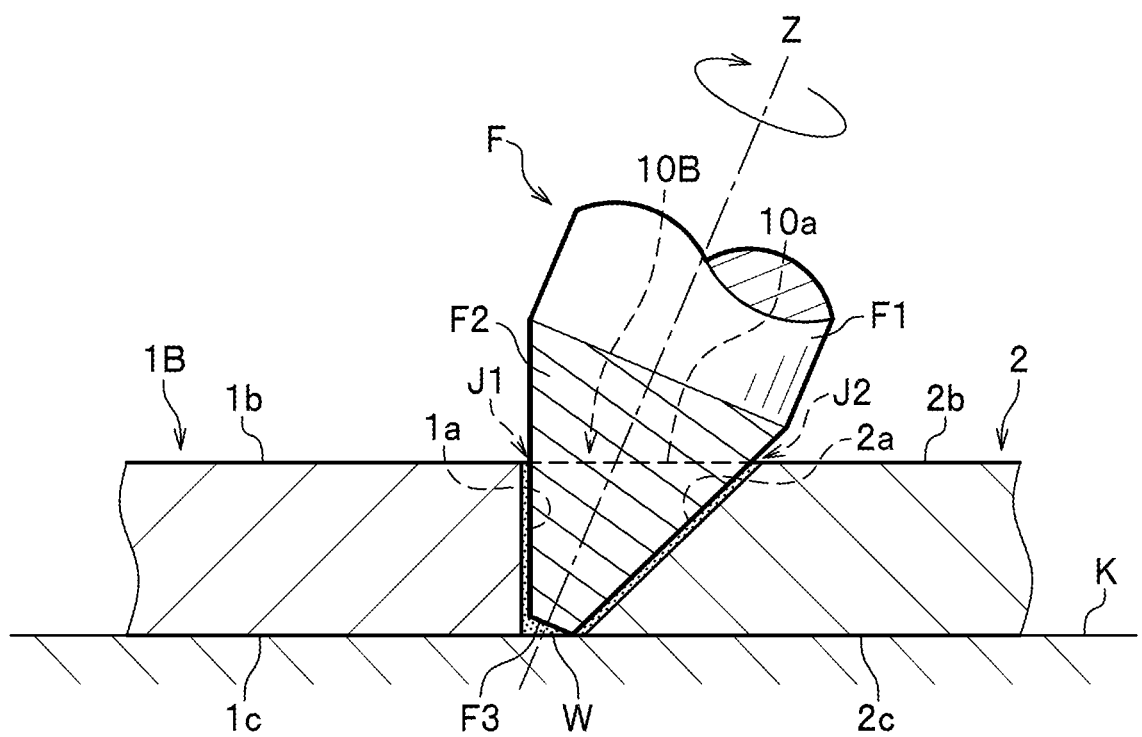
FIG. 6 is a cross sectional view showing a joining process of the joining method according to the third embodiment.

As shown in FIG. 6, in the joining process, friction stir welding is performed with use of the rotary tool F. In this embodiment, friction stir welding is performed to the butted portions J1, J2 by moving the rotary tool F along the auxiliary member 10B in a state where only the stirring pin F2 of the rotary tool F is inserted into the auxiliary member 10B and the base end side of the stirring pin F2 is exposed. Furthermore, in this embodiment, friction stirring is performed in a state where the rotational axis Z of the stirring pin F2 is inclined toward the second metal member 2 side and the outer circumferential face of the stirring pin F2 is slightly brought into contact with the end face 1a of the first metal member 1 and the end face 2a of the second metal member 2. Note that, the inclined angle of the rotary tool F may be appropriately set, but it is preferable to set the inclined angle so that the outer circumferential face of the stirring pin F2 and the end face 1a of the first metal member 1B are parallel with each other and the outer circumferential face of the stirring pin F2 and the end face 2a of the second metal member 2 are parallel with each other.

Also according to the joining method according to the third embodiment, almost the same effect as that of the first embodiment can be obtained. Furthermore, in this embodiment, since the end face 1a of the first metal member 1 has not to be formed as an inclined face, the labor of work can be saved.

Fourth Embodiment

Figure 7:
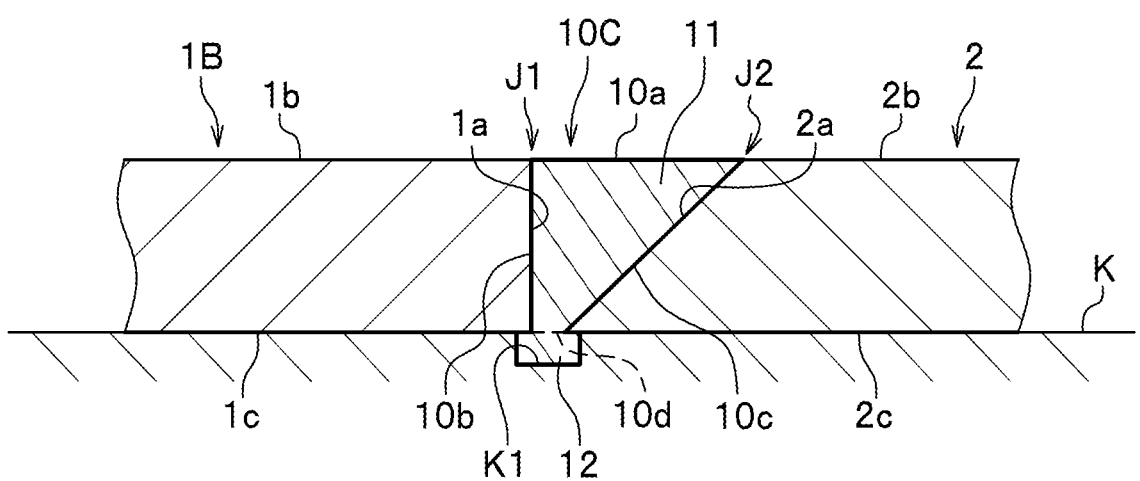
FIG. 7 is a cross sectional view showing a butting process of a joining method according to a fourth embodiment of the present invention.

Next, a joining method according to a fourth embodiment will be described. FIG. 7 is a cross sectional view showing a butting process of the joining method according to the fourth embodiment of the present invention. In the joining method according to the fourth embodiment, a preparation process, the butting process, and a joining process are performed. In the fourth embodiment, a shape of an auxiliary member 10C mainly differs from that of the third embodiment. In this embodiment, matters different from those of the third embodiment will be mainly described.

As shown in FIG. 7, a first metal member 1B and a second metal member 2 are the same as those of the third embodiment. An auxiliary member 10C is provided with a body portion 11 having a trapezoidal cross section, and a protruding portion 12 protruding downward from a back face (bottom) 10d of the body portion 11. The protruding portion 12 has a rectangular cross section which is wider than the back face (bottom) 10d of the body portion 11. The protruding portion 12 is formed to have a shape constant in the longitudinal direction of the auxiliary member 10C. A recessed portion K1, into which the protruding portion 12 is inserted, is formed on the base frame K.

In the butting process, the first metal member 1B, the second metal member 2, and the auxiliary member 10C are butted against one another and fixed to the base frame K. In the butting process, at first, the protruding portion 12 of the auxiliary member 10C is inserted into the recessed portion K1. Next, the first metal member 1B and the second metal member 2 are butted against each other via the auxiliary member 10C from respective sides of the auxiliary member 10C. The protruding portion 12 is engaged with both the back face 1c of the first metal member 1 and the back face 2c of the second metal member 2. A butted portion J1 is formed by butting the end face 1a of the first metal member 1 against a side face 10b of the auxiliary member 10C. Abutted portion J2 is formed by butting the end face 2a of the second metal member 2 against a side face 10c of the auxiliary member 10C.

In the joining process, friction stir welding is performed to the butted portions J1, J2 with use of the rotary tool F. In this embodiment, friction stir welding is performed in the same manner as that of the third embodiment. Note that, after the joining process is finished, a cutting process to cut the protruding portion 12 may be performed, or the protruding portion 12 may be left.

Also according to the fourth embodiment described in the above, almost the same effect as that of the third embodiment can be achieved. In the fourth embodiment, since the auxiliary member 10C is provided with the protruding portion 12, the auxiliary member 10C can be prevented from being floated upward. Hereby, the position of the auxiliary member 10C with respect to the first metal member 1B and the second metal member 2 is prevented from shifting, so that friction stir welding can be more suitably performed.

Note that, in this embodiment, the protruding portion 12 is set to be engaged with both the first metal member 1B and the second metal member 2. But it may be engaged with at least one of the first metal member 1B and the second metal member 2 so that the auxiliary member 10C is not floated.

Fifth Embodiment

Figure 8:
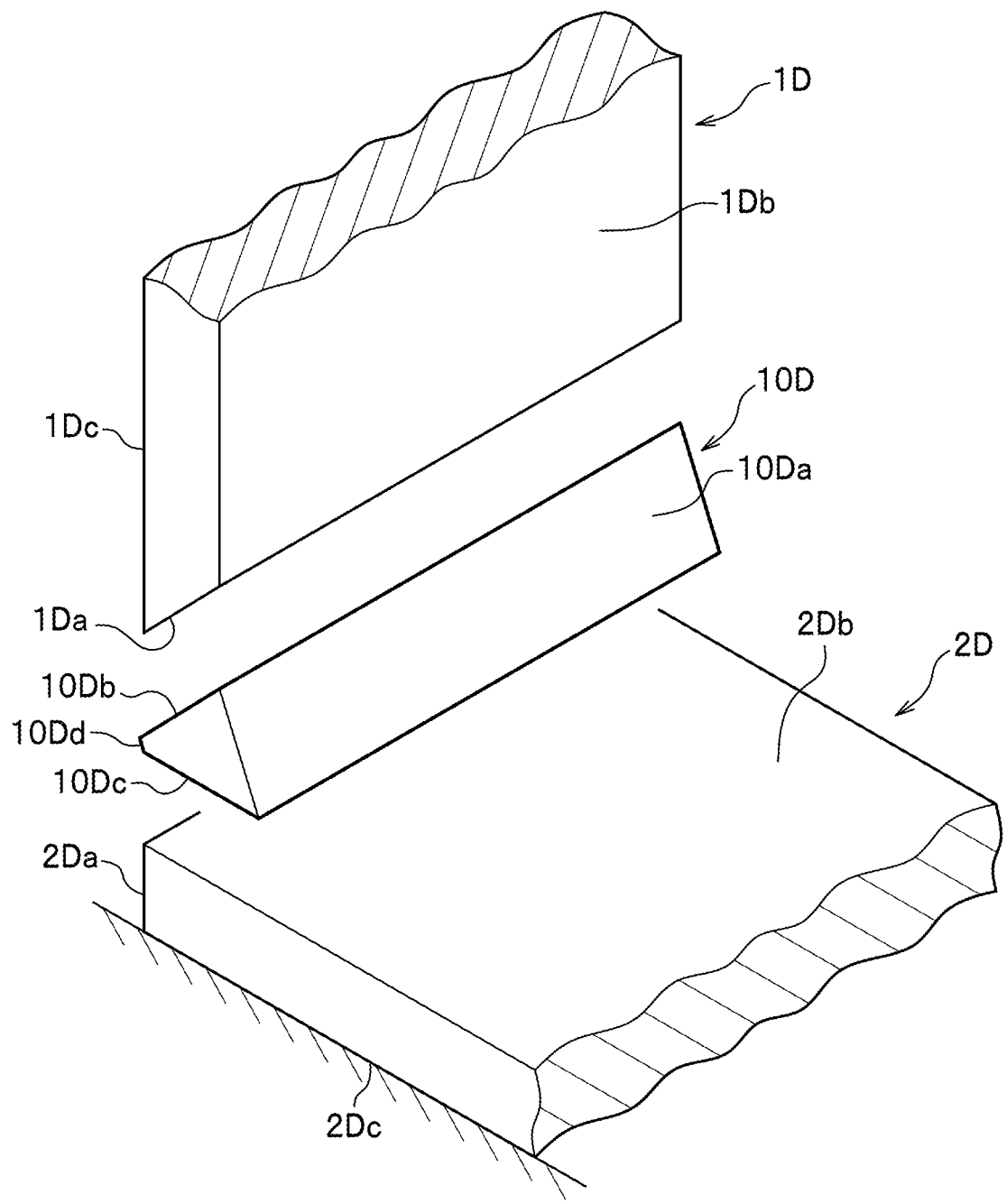
FIG. 8 is a perspective view showing a preparation process of a joining method according to a fifth embodiment of the present invention.

Next, a joining method according to a fifth embodiment of the present invention will be described. FIG. 8 is a perspective view showing a preparation process of the joining method according to the fifth embodiment of the present invention. As shown in FIG. 8, in the fifth embodiment, a first metal member 1D and a second metal member 2D are orthogonally joined. This point differs from the other embodiments.

In the joining method according to the fifth embodiment, the preparation process, a butting process, and a joining process are performed. In the preparation process, the first metal member 1D, the second metal member 2D, and an auxiliary member 10D are prepared. The first metal member 1D has a plate-like shape, and is provided with an end face 1Da and side faces 1Db, 1Dc. The end face 1Da is an inclined face. The second metal member 2D has a plate-like shape, and is provided with an end face 2Da and side faces 2Db, 2Dc. The end face 2Da and the side face 2Db are orthogonal to each other.

The auxiliary member 10d is an elongated member having a trapezoidal cross section. The auxiliary member 10D is provided with a front face 10Da, side faces 10Db, 10Dc, and a back face 10Dd.

Figure 9:
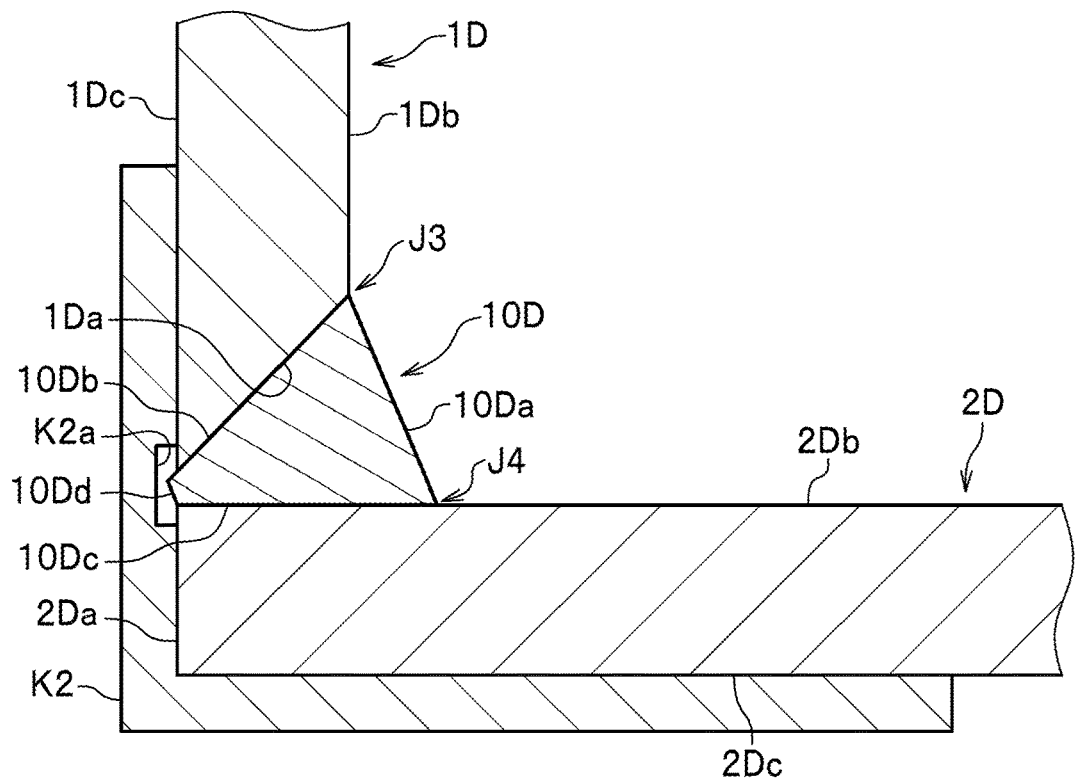
FIG. 9 is a cross sectional view showing a butting process of the joining method according to the fifth embodiment.

As shown in FIG. 9, in the butting process, the first metal member 1D and the second metal member 2D are orthogonally butted against each other by interposing the auxiliary member 10D between the first metal member 1D and the second metal member 2D. In this embodiment, the first metal member 1D and the second metal member 2D are butted against each other in a state where a base frame K2 is disposed on the back sides of the first metal member 1D and the second metal member 2D. The base frame K2 has an L-shaped cross section and is provided with a recessed portion K2a extended in the longitudinal direction. The recessed portion K2a is provided in order to avoid interference between the base frame K2 and the tip of the auxiliary member 10D.

A butted portion J3 is formed by butting the end face 1Da of the first metal member 1D and the side face 10Db of the auxiliary member 10D against each other. A butted portion J4 is formed by butting the side face 2Db of the second metal member 2D and the side face 10Dc of the auxiliary member 10D against each other. The first metal member 1D and the second metal member 2D are orthogonal to each other. Since the tip of the auxiliary member 10D is slightly projected from the side face 1Dc of the first metal member 1, the tip of the auxiliary member 10D is inserted into the recessed portion K2a.

Figure 10:
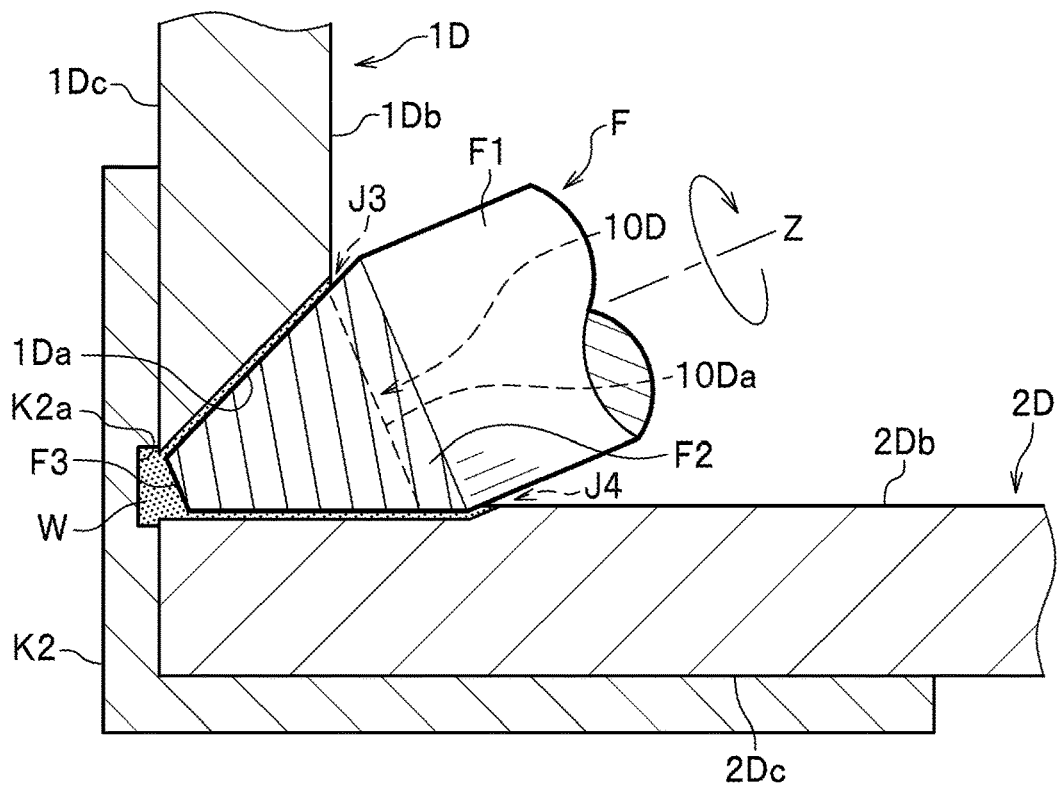
FIG. 10 is a cross sectional view showing a joining process of the joining method according to the fifth embodiment.

As shown in FIGS. 9, 10, the joining process is a process to perform friction stir welding to the butted portions J3, J4 with use of the rotary tool F. In the joining process, the friction stir welding is performed to the butted portions J3, J4 by moving the rotary tool F along the auxiliary member 10D in a state where only the stirring pin F2 of the rotary tool F is inserted into the front face 10Da of the auxiliary member 10D and a portion of the base end side of the stirring pin F2 is exposed.

In this embodiment, friction stirring is performed in a state where the rotational axis Z of the stirring pin F2 is inclined toward the second metal member 2D side and the outer circumferential face of the stirring pin F2 is slightly brought into contact with the end face 1Da of the first metal member 1D and the side face 2Db of the second metal member 2D. Note that, the inclined angle of the rotary tool F may be appropriately set, but it is preferable to set the inclined angle so that the outer circumferential face of the stirring pin F2 and the end face 1Da of the first metal member 1D are parallel with each other and the outer circumferential face of the stirring pin F2 and the side face 2Db of the second metal member 2D are parallel with each other.

Also by the joining method according to the fifth embodiment described in the above, almost the same effect as that of the first embodiment can be obtained. Further, in this embodiment, the first metal member 1D and the second metal member 2D can be orthogonally joined.

Sixth Embodiment

Figure 11:
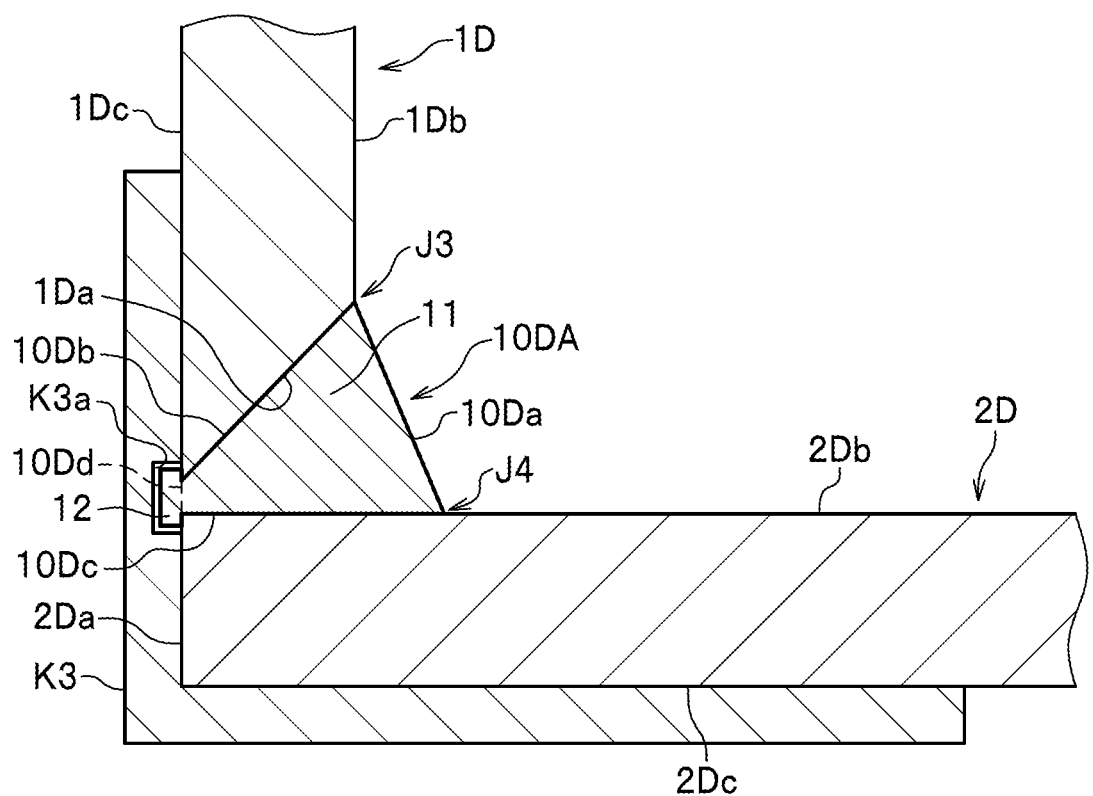
FIG. 11 is a cross sectional view showing a butting process of a joining method according to a sixth embodiment of the present invention.

Next, a joining method according to a sixth embodiment of the present invention will be described. FIG. 11 is a cross sectional view showing a butting process of the joining method according to the sixth embodiment of the present invention. In the joining method according to the sixth embodiment, a preparation process, the butting process, and a joining process are performed. In the sixth embodiment, a shape of an auxiliary member 10DA mainly differs from that of the fifth embodiment. In this embodiment, matters different from those of the fifth embodiment will be mainly described.

As shown in FIG. 11, a first metal member 1D and a second metal member 2D are the same as those of the fifth embodiment. An auxiliary member 10DA is provided with a body portion 11 having a trapezoidal cross section and a protruding portion 12 protruding laterally from a back face (bottom) 10Dd of the body portion 11. The protruding portion 12 has a rectangular cross section which is wider than the back face (bottom) 10Dd of the body portion 11. The protruding portion 12 is formed to have a shape constant in the longitudinal direction of the auxiliary member 10DA.

In the butting process, the first metal member 1D and the second metal member 2D are orthogonally butted against each other in a state where the auxiliary member 10DA is interposed between the first metal member 1D and the second metal member 2D, and fixed to a base frame K3. The base frame K3 is disposed on the back sides of the first metal member 1D and the second metal member 2D. A recessed portion K3a is formed on the base frame K3 to insert the protruding portion 12 thereinto.

In the butting process, at first, the protruding portion 12 of the auxiliary member 10DA is inserted from an opening portion on the anterior side or the posterior side of the recessed portion K3a of the base frame K3. Next, in the butting process, the first metal member 1D and the second metal member 2D are butted against from respective sides of the auxiliary member 10DA. The protruding portion 12 is engaged with both the side face 1Dc of the first metal member 1D and the end face 2Da of the second metal member 2D. A butted portion J3 is formed by butting an end face 1Da of the first metal member 1D against a side face 10Db of the auxiliary member 10DA. A butted portion J4 is formed by butting a side face 2Db of the second metal member 2D against a side face 10Dc of the auxiliary member 10DA.

In the joining process, friction stir welding is performed to the butted portions J3, J4 with use of the rotary tool F. In this embodiment, the friction stir welding is performed in the same manner as that of the fifth embodiment. Note that, after the joining process is finished, a cutting process to cut the protruding portion 12 may be performed, or the protruding portion 12 may be left.

Also according to the sixth embodiment described in the above, almost the same effect as that of the fifth embodiment can be achieved. In the sixth embodiment, since the auxiliary member 10DA is provided with the protruding portion 12, the auxiliary member 10DA can be prevented from being floated upward. Hereby, the position of the auxiliary member 10DA with respect to the first metal member 1D and the second metal member 2D is prevented from shifting, so that friction stir welding can be more suitably performed.

Note that, in this embodiment, the protruding portion 12 is set to be engaged with both the first metal member 1D and the second metal member 2D. But it may be engaged with at least one of the first metal member 1D and the second metal member 2D so that the auxiliary member 10DA is not floated.

Seventh Embodiment

Figure 12:
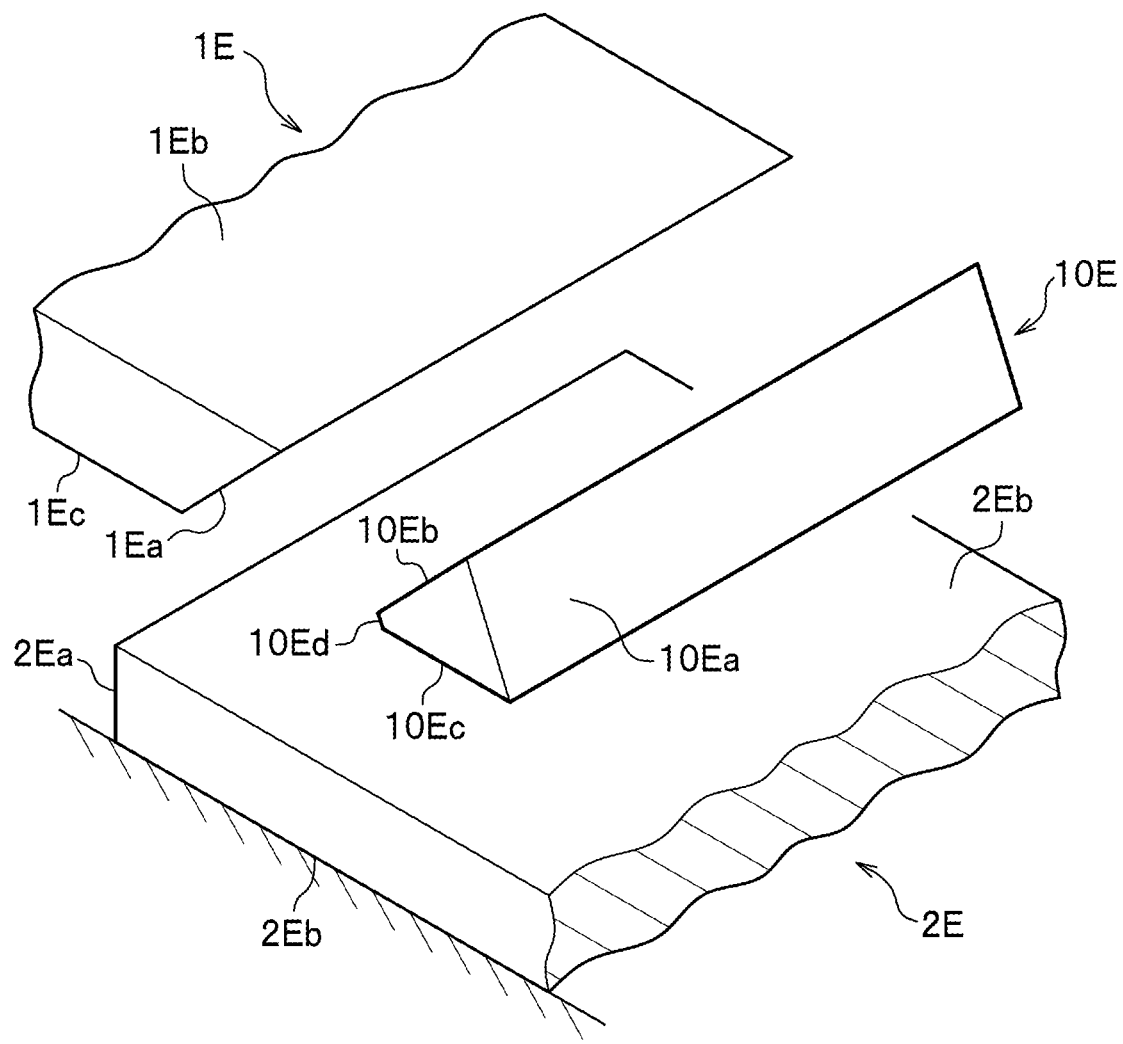
FIG. 12 is a perspective view showing a preparation process of a joining method according to a seventh embodiment of the present invention.

Next, a joining method according to a seventh embodiment of the present invention will be described. FIG. 12 is a perspective view showing a preparation process of the joining method according to the seventh embodiment of the present invention. As shown in FIG. 12, the seventh embodiment differs from the other embodiments in that a first metal member 1E and a second metal member 2E are overlapped with each other to join together.

In the joining method according to the seventh embodiment, the preparation process, a butting process, and a joining process are performed. In the preparation process, the first metal member 1E, the second metal member 2E, and an auxiliary member 10E are prepared.

The first metal member 1E has a plate-like shape, and is provided with an end face 1Ea, a front face 1Eb, and a back face 1Ec. The second metal member 2E has a plate-like shape, and is provided with an end face 2Ea, a front face 2Eb, and a back face 2Ec. The end face 2Ea is orthogonal to the front face 2Eb.

The auxiliary member 10E is an elongated member having a trapezoidal cross section. The auxiliary member 10E is provided with a front face 10Ea, side faces 10Eb, 10Ec, and a back face 10Ed. The side faces 10Eb, 10Ec are inclined faces which are closer to each other with increasing distance from the front face 10Ea.

Figure 13:
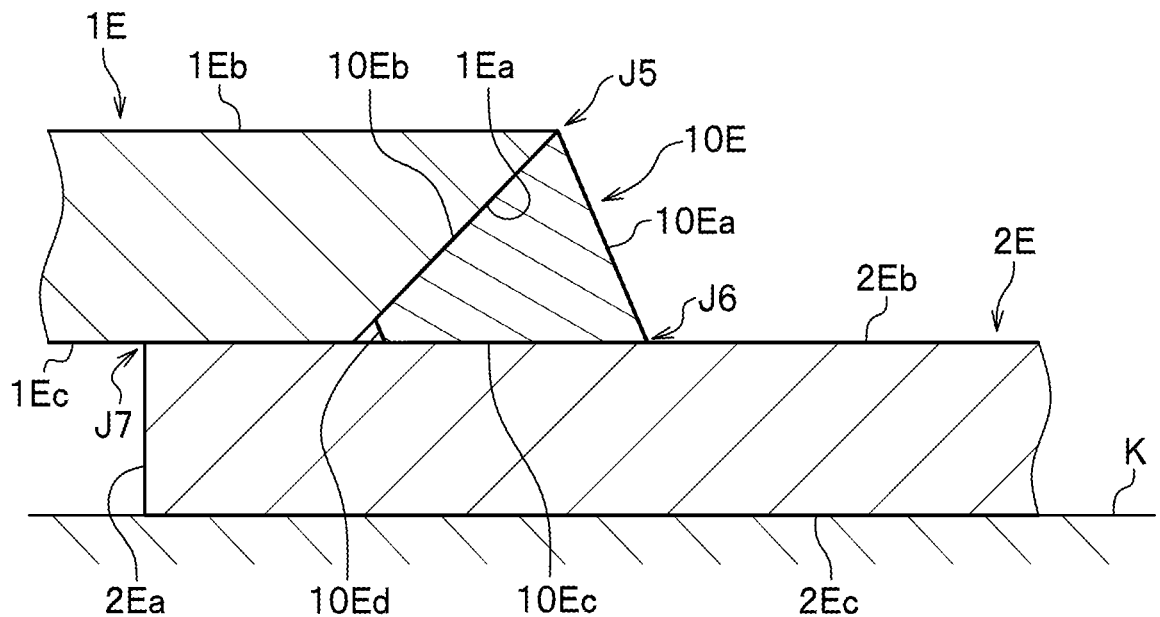
FIG. 13 is a cross sectional view showing a butting process of the joining method according to the seventh embodiment.

As shown in FIG. 13, the butting process is a process in which the first metal member 1E and the second metal member 2E are overlapped with each other, and the auxiliary member 10E is disposed at an end of the first metal member 1E. In the butting process, a butted portion J7 is formed by overlapping the back face 1Ec of the first metal member 1E and the front face 2Eb of the second metal member 2E with each other. Further, a butted portion J5 is formed by butting the end face 1Ea of the first metal member 1E against the side face 10Eb of the auxiliary member 10E. And further, abutted portion J6 is formed by butting the front face 2Eb of the second metal member 2E against the side face 10Ec of the auxiliary member 10E.

Figure 14:
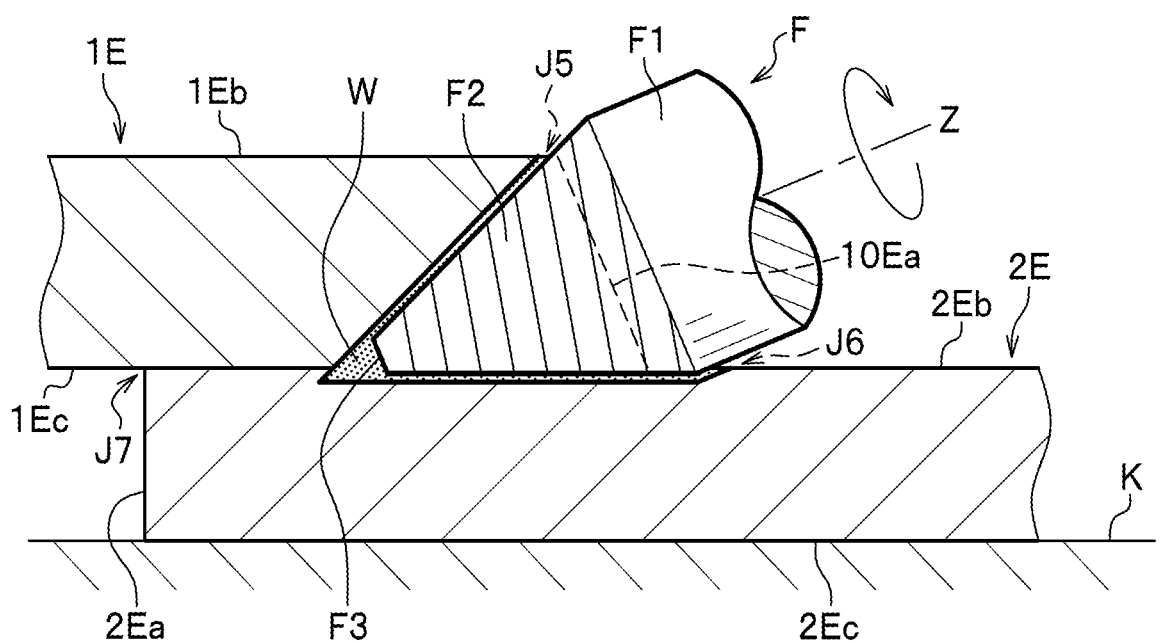
FIG. 14 is a cross sectional view showing a joining process of the joining method according to the seventh embodiment.

As shown in FIG. 14, the joining process is a process in which friction stir welding is performed to the butted portions J5, J6 with use of the rotary tool F. In the joining process, friction stir welding is performed to the butted portions J5, J6 by moving the rotary tool F along the auxiliary member 10E in a state where only the stirring pin F2 of the rotary tool F is inserted into the front face 10Ea of the auxiliary member 10E and a portion of the base end side of the stirring pin F2 is exposed. Furthermore, in this embodiment, friction stirring is performed in a state where the rotational axis Z of the stirring pin F2 is inclined to the second metal member 2E side and the outer circumferential face of the stirring pin F2 is slightly brought into contact with the end face 1Ea (refer to FIG. 13) of the first metal member 1E and the front face 2Eb of the second metal member 2E. Note that, the inclined angle of the rotary tool F may be appropriately set, and it is preferable to set the inclined angle so that the outer circumferential face of the stirring pin F2 is parallel with the end face 1Ea of the first metal member 1E and the outer circumferential face of the stirring pin F2 is parallel with the front face 2Eb of the second metal member 2E.

Also according to the joining method according to the seventh embodiment described in the above, almost the same effect as that of the first embodiment can be obtained. Further, in this embodiment, the first metal member 1E and the second metal member 2E can be joined in the state of being overlapped with each other.

Eighth Embodiment

Figure 15:
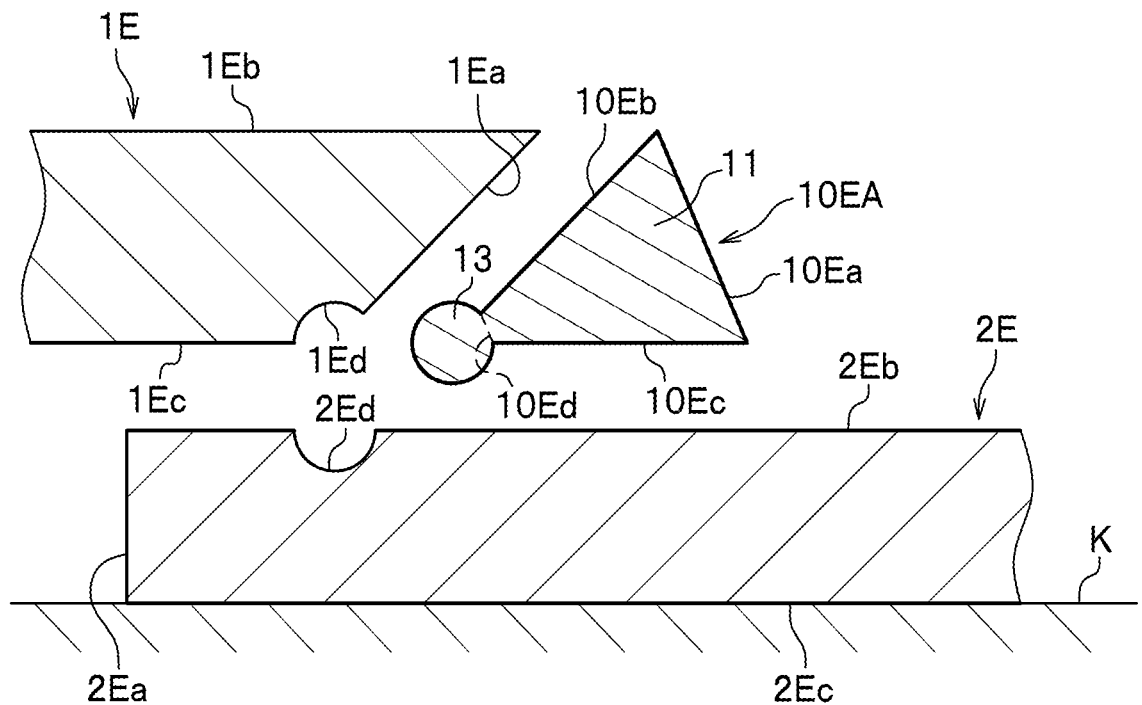
FIG. 15 is a cross sectional view showing a preparation process of a joining method according to an eighth embodiment of the present invention.

Next, a joining method according to an eighth embodiment of the present invention will be described. FIG. 15 is a cross sectional view showing a preparation process of the joining method according to the eighth embodiment of the present invention. In the joining method according to the eighth embodiment, the preparation process, a butting process, and a joining process are performed. In the eighth embodiment, a shape of an auxiliary member 10EA differs from that of the seventh embodiment. In this embodiment, matters different from those of the seventh embodiment will be mainly described.

As shown in FIG. 15, in the preparation process of this embodiment, a groove portion 1Ed is formed on a back face 1Ec side of a first metal member 1E. The groove portion 1Ed has a circular cross section and is formed in the longitudinal direction at the corner portion formed by the end face 1Ea and the back face 1Ec. Further, in the preparation process, a groove portion 2Ed is formed on a front face 2Eb of a second metal member 2E. The groove portion 2Ed has an arcuate cross section and is formed in the longitudinal direction.

The auxiliary member 10EA is provided with a body portion 11 having a trapezoidal cross section and a protruding portion 13 protruding from a back face (bottom) 10Ed of the body portion 11. The protruding portion 13 has a circular cross section which is wider than the back face (bottom) 10Ed of the body portion 11. And the protruding portion 13 is formed to have a shape constant in the longitudinal direction of the auxiliary member 10EA.

The butting process is a process in which the auxiliary member 10EA is disposed at the end portion of the first metal member 1E while the first metal member 1E and the second metal member 2E are overlapped.

Figure 16:
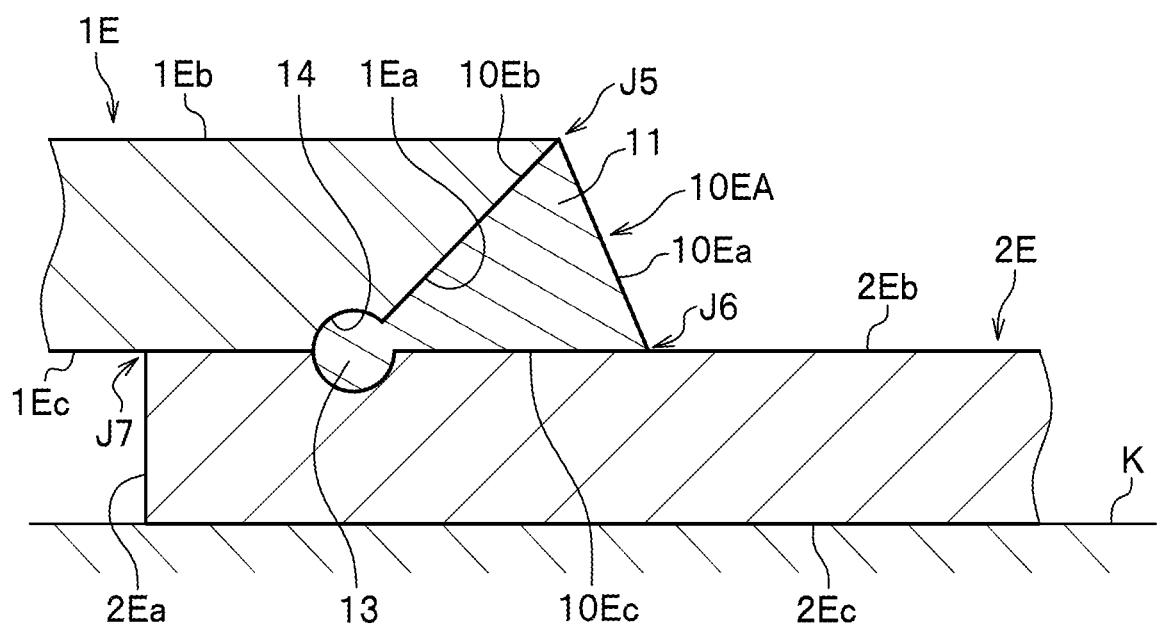
FIG. 16 is a cross sectional view showing a butting process of the joining method according to the eighth embodiment.

As shown in FIG. 16, in the butting process, a butted portion J7 is formed by overlapping the back face 1Ec of the first metal member 1E and the front face 2Eb of the second metal member 2E with each other. Further, a butted portion J5 is formed by butting the end face 1Ea of the first metal member 1E against a side face 10Eb of the auxiliary member 10EA. Furthermore, a butted portion J6 is formed by butting the front face 2Eb of the second metal member 2E against a side face 10Ec of the auxiliary member 10EA. Further, the protruding portion 13 is inserted into a recessed groove 14 formed by the groove portion 1Ed (refer to FIG. 15) of the first metal member 1E and the groove portion 2Ed of the second metal member 2E.

In the joining process, friction stir welding is performed to the butted portions J5, J6 with use of the rotary tool F. In this embodiment, friction stir welding is performed in the same manner as that of the seventh embodiment.

Also according to the eighth embodiment described in the above, almost the same effect as that of the seventh embodiment can be achieved. Since the auxiliary member 10EA is provided with the protruding portion 13, the auxiliary member 10EA can be prevented from being floated. Note that, in this embodiment, the recessed groove 14 is formed by the first metal member 1E and the second metal member 2E, but may be formed on at least one of the first metal member 1E and the second metal member 2E. In a case where the recessed groove is formed on one of the first metal member 1E and the second metal member 2E, a shape of the protruding portion 13 of the auxiliary member 10EA may be appropriately formed according to a shape of the recessed groove.

Ninth Embodiment

Figure 17:
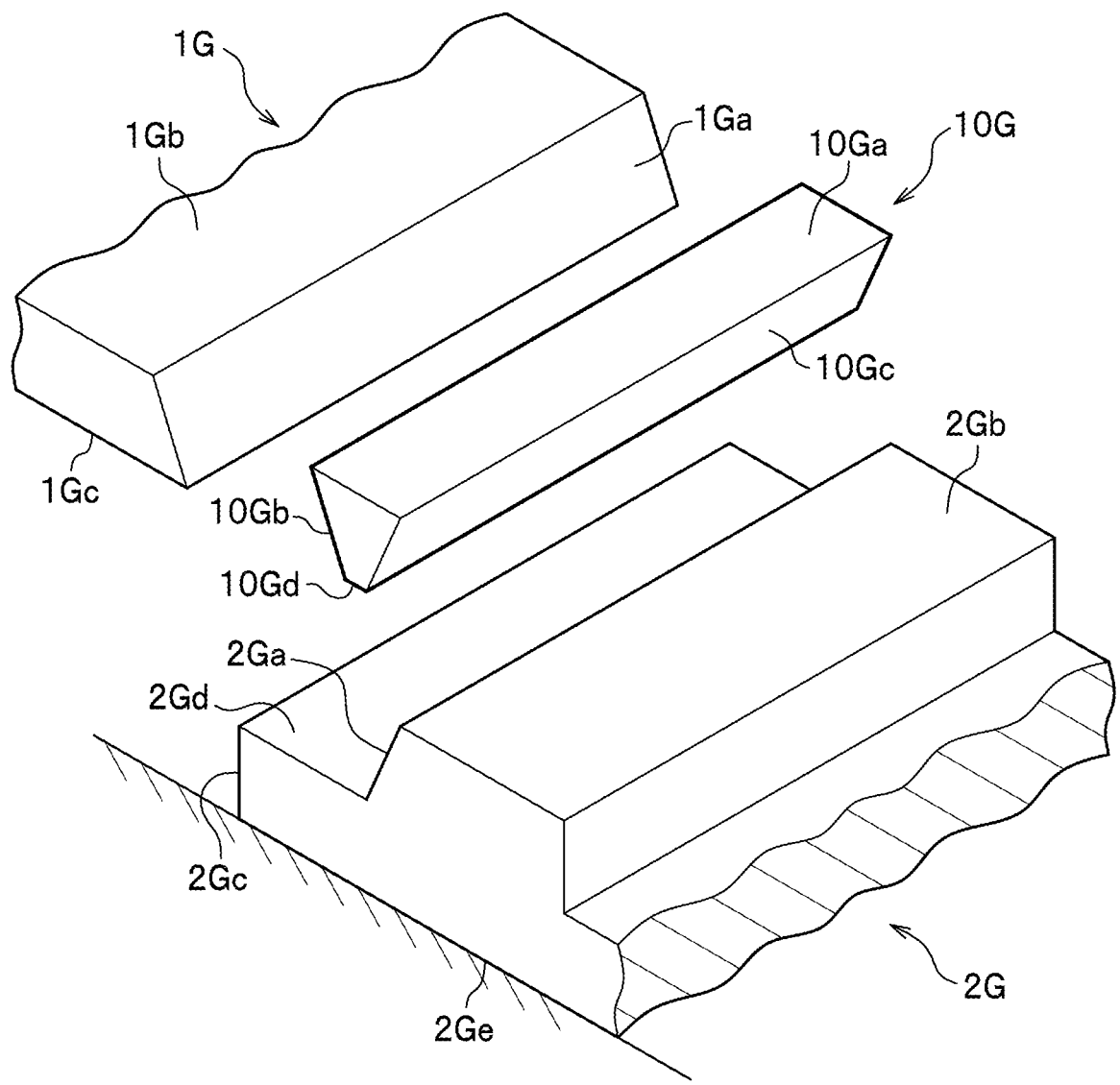
FIG. 17 is a perspective view showing a preparation process of a joining method according to a ninth embodiment of the present invention.

Next, a joining method according to a ninth embodiment of the present invention will be described. FIG. 17 is a perspective view showing a preparation process of the joining method according to the ninth embodiment of the present invention. As shown in FIG. 17, the ninth embodiment differs from the other embodiments in that a first metal member 1G and a second metal member 2G are butted while the first metal member 1G and the second metal member 2G are overlapped with each other.

In the joining method according to the ninth embodiment, the preparation process, a butting process, and a joining process are performed. In the preparation process, the first metal member 1G, the second metal member 2G, and an auxiliary member 10G are prepared. The first metal member 1G has a plate-like shape, and is provided with an end face 1Ga, a front face 1Gb, and a back face 1Gc. The end face 1Ga is an inclined face.

The second metal member 2G has a shape provided with a step portion formed of a thick plate portion and a thin plate portion. The second metal member 2 has a first end face 2Ga, a first front face 2Gb, a second end face 2Gc, a second front face 2Gd, and a back face 2Ge. The first end face 2Ga is an inclined face. The second end face 2Gc is orthogonal to the second front face 2Gd and the back face 2Ge.

Figure 18:
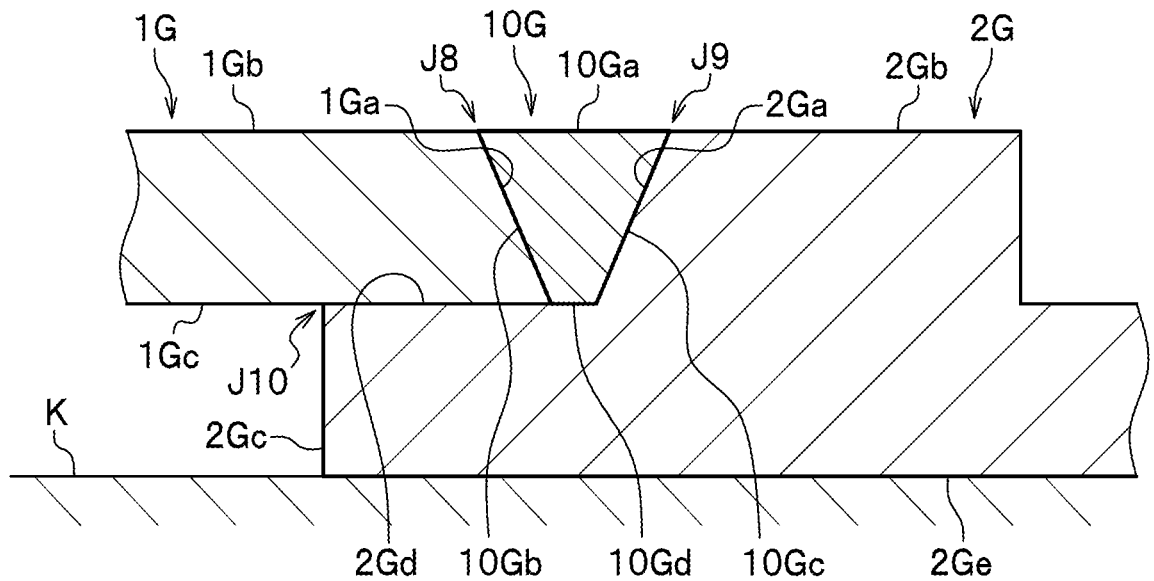
FIG. 18 is a cross sectional view showing a butting process of the joining method according to the ninth embodiment.

As shown in FIG. 18, the butting process is a process in which the first metal member 1G and the second metal member 2G are butted against each other via the auxiliary member 10G while the first metal member 1G and the second metal member 2G are overlapped with each other. In the butting process, a butted portion J10 is formed by overlapping the back face 1Gc of the first metal member 1G and the second front face 2Gd of the second metal member 2G with each other. Further, a butted portion J8 is formed by butting a side face 10Gb of the auxiliary member 10G against the end face 1Ga of the first metal member 1G. And further, a butted portion J9 is formed by butting a side face 10Gc of the auxiliary member 10G against the first end face 2Ga of the second metal member 2G.

Figure 19:
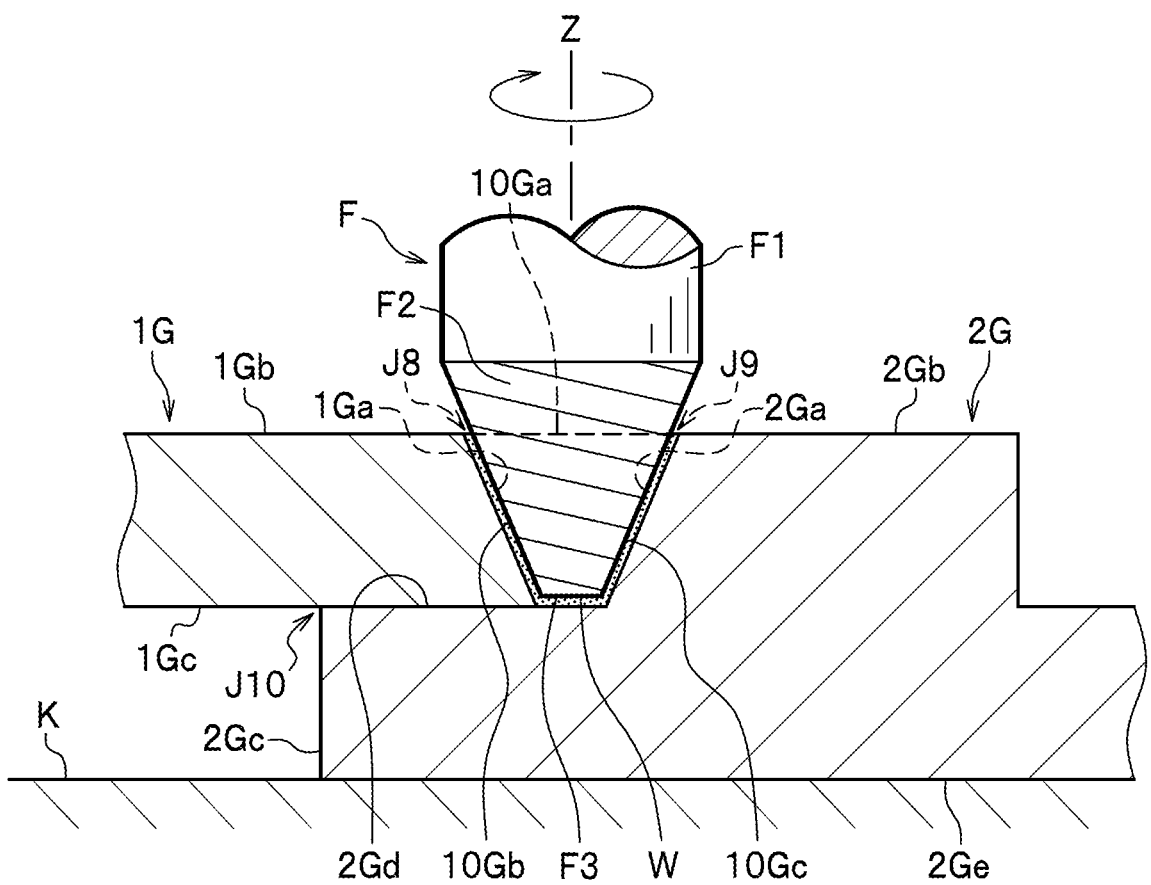
FIG. 19 is a cross sectional view showing a joining process of the joining method according to the ninth embodiment.

As shown in FIG. 19, the joining process is a process in which friction stir welding is performed to the first metal member 1G and the second metal member 2G with use of the rotary tool F. In the joining process, the stirring pin F2 of the rotary tool F which is being rotated clockwise is inserted into a front face 10Ga of the auxiliary member 10G in the middle in the width direction of the front face 10Ga. In the joining process of this embodiment, the rotary tool F is moved along the auxiliary member 10G in a state where the stirring pin F2 is slightly brought into contact with the end face 1Ga of the first metal member 1G and the first end face 2Ga of the second metal member 2G.

In the joining process, friction stirring is performed in a state where only the stirring pin F2 is brought into contact with the first metal member 1G, the second metal member 2G, and the auxiliary member 10G, and a base end side of the stirring pin F2 is exposed from the first metal member 1G and the second metal member 2G. The flat face F3 of the stirring pin F2 is inserted into a deep position as far as it does not reach the second front face 2Gd of the second metal member 2G. After the rotary tool F is moved along the auxiliary member 10G and reaches an end position, the rotary tool F is removed from the auxiliary member 10G. By the manner described in the above, the butted portions J8 and J9 are friction stir welded simultaneously by one process. A plasticized region W is formed along the moving track of the rotary tool F.

Also according to the ninth embodiment described in the above, almost the same effect as that of the first embodiment can be achieved.

Tenth Embodiment

Figure 20:
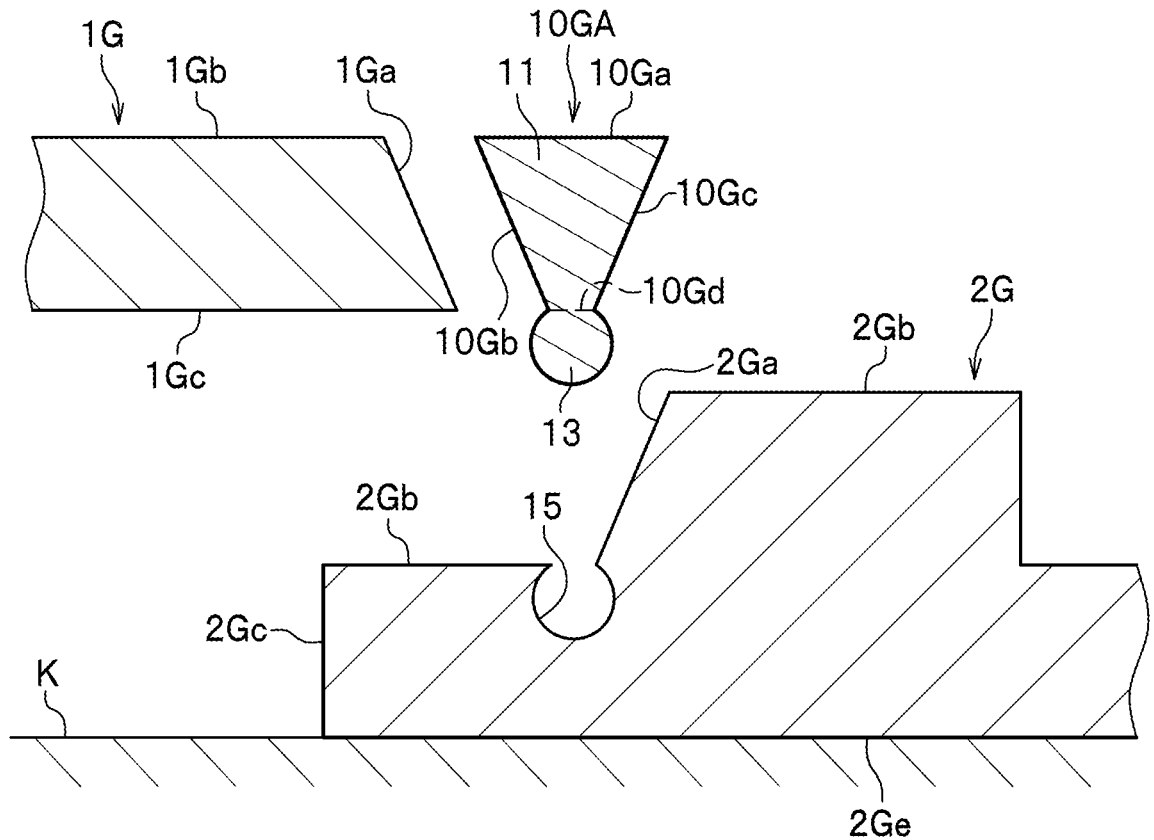
FIG. 20 is a cross sectional view showing a preparation process of a joining method according to a tenth embodiment of the present invention.

Next, a joining method according to a tenth embodiment of the present invention will be described. FIG. 20 is a cross sectional view showing a preparation process of the joining method according to the tenth embodiment of the present invention. In the joining method according to the tenth embodiment, the preparation process, a butting process, and a joining process are performed. In the tenth embodiment, a shape of an auxiliary member 10GA mainly differs from that of the ninth embodiment. In this embodiment, matters different from those of the ninth embodiment will be mainly described.

As shown in FIG. 20, a first metal member 1G is the same as that of the ninth embodiment. A recessed groove 15 having an almost circular cross section is formed on a second front face 2Gd of a second metal member 2G. The recessed groove 15 is formed to have the almost circular cross section.

An auxiliary member 10G is provided with a body portion 11 having a trapezoidal cross section and a protruding portion 13 protruding from a back face (bottom) 10Gd of the body portion 11. The protruding portion 13 has a circular cross section wider than the back face 10Gd (bottom). The protruding portion 13 is formed to have a shape constant in the longitudinal direction of the auxiliary member 10GA so that the protruding portion 13 can be inserted into the recessed groove 15.

Figure 21:
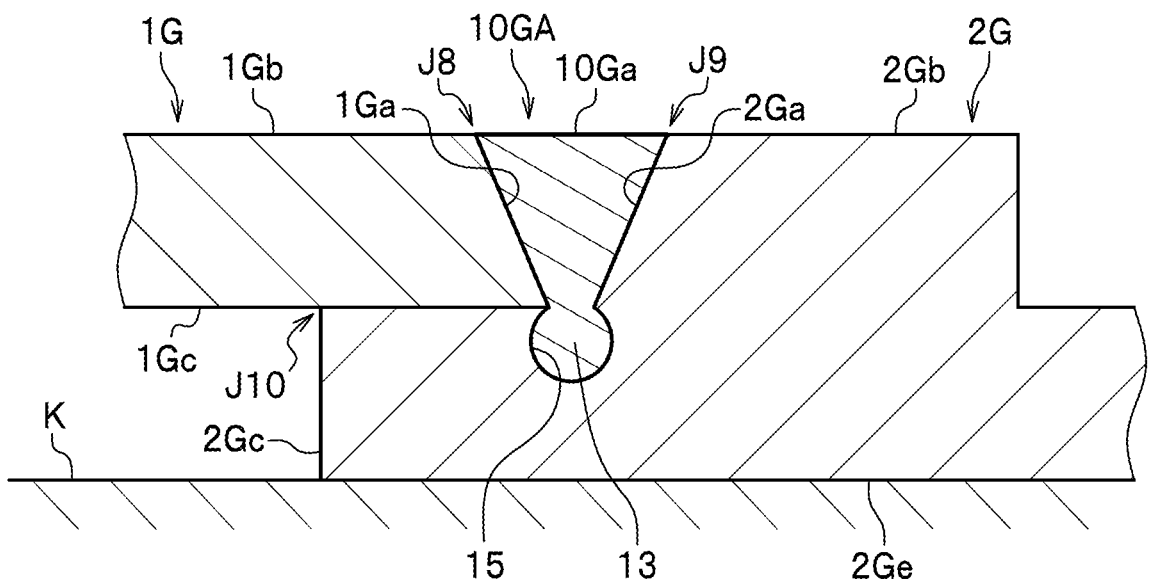
FIG. 21 is a cross sectional view showing a butting process of the joining method according to the tenth embodiment.

As shown in FIG. 21, in the butting process, the first metal member 1G, the second metal member 2G, and the auxiliary member 10GA are butted against one another and fixed to the base frame K. In the butting process, at first, the protruding portion 13 of the auxiliary member 10GA is inserted into the recessed groove 15. For example, the protruding portion 13 is inserted from an opening portion on the anterior side or the posterior side of the recessed groove 15. Next, butted portions J8, J9, J10 are formed by butting the respective members against one another in the same manner as that of the ninth embodiment. The joining process is the same as that of the ninth embodiment.

Also according to the tenth embodiment described in the above, almost the same effect as that of the ninth embodiment can be achieved. Furthermore, the auxiliary member 10GA can be prevented from being floated by providing the protruding portion 13.

In the above, the embodiments of the present invention have been described, but appropriate design changes can be made within a range consistent with the object of the present invention. For example, also in the joining processes according to the second to tenth embodiments, the outer circumferential face of the stirring pin F2 is slightly brought into contact with the first metal member and the second metal member. However, friction stir welding may be performed in a state where the stirring pin F2 of the rotary tool F is not brought into contact with the first metal member nor the second metal member.

Eleventh Embodiment

Figure 22:
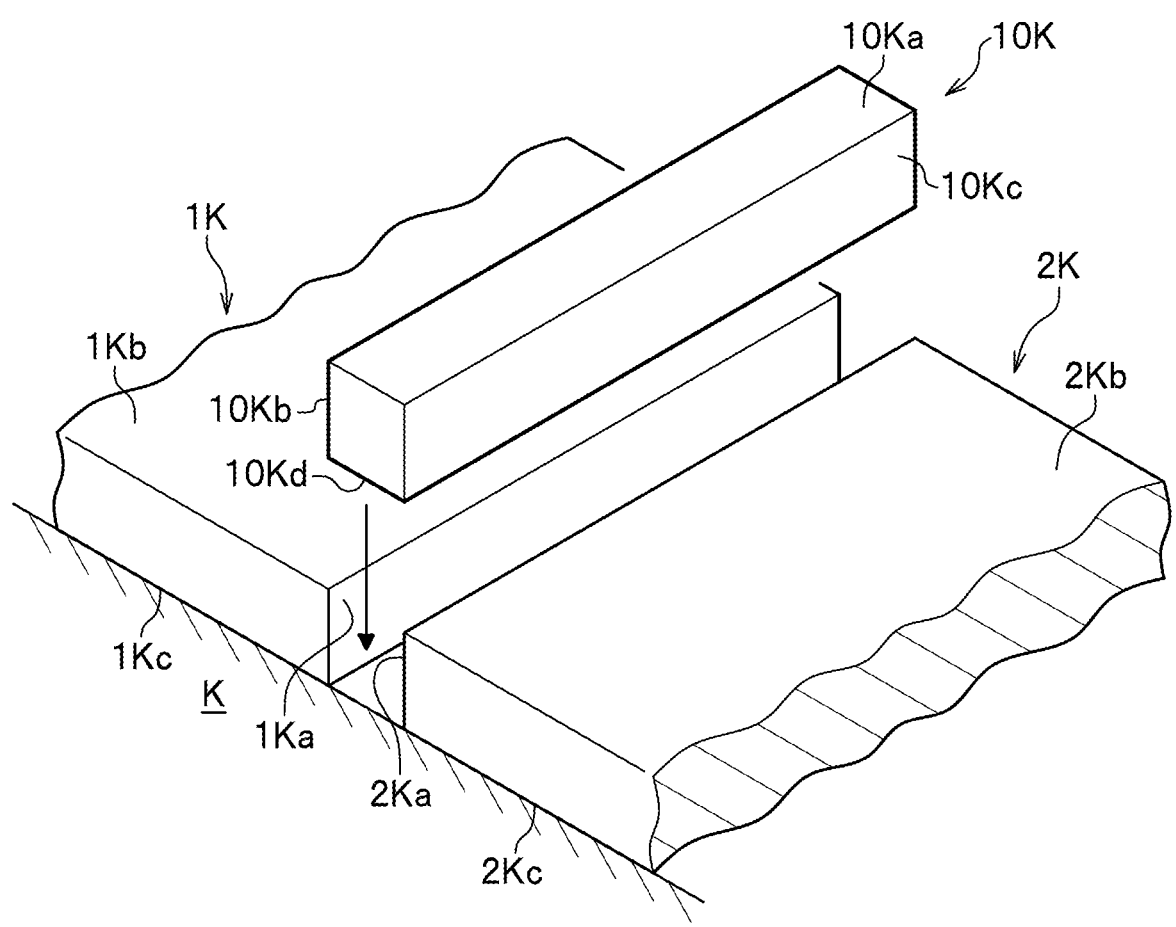
FIG. 22 is a perspective view showing a preparation process of a joining method according to an eleventh embodiment of the present invention.

An eleventh embodiment of the present invention will be described appropriately with reference to FIGS. In a joining method according to the eleventh embodiment, a preparation process, a butting process, and a joining process are performed. As shown in FIG. 22, in this embodiment, a first metal member 1K and a second metal member 2K are friction stir welded.

As shown in FIG. 22, the preparation process is a process in which the first metal member 1K, the second metal member 2K, and an auxiliary member 10K are prepared. Each of the first metal member 1K and the second metal member 2K is a plate-like metal member. The first metal member 1K and the second metal member 2K are not specifically limited so long as they are made of metal which can be frictionally stirred. For example, aluminum or an aluminum alloy is used. Each of the first metal member 1K and the second metal member 2K is made of an aluminum alloy casting material such as JISH5302ADC12 (based on Al—Si—Cu). The first metal member 1K is provided with an end face 1Ka formed on an end portion, a front face 1Kb, and a back face 1Kc. The end face 1Ka is orthogonal to the front face 1Kb and the back face 1Kc. The second metal member 2K is provided with an end face 2Ka formed on an end portion, a front face 2Kb, and a back face 2Kc. The end face 2Ka is orthogonal to the front face 2Kb and the back face 2Kc. A thickness of the first metal member 1K is the same as that of the second metal member 2K.

The auxiliary member 10K is a member to be interposed between the first metal member 1K and the second metal member 2K. The auxiliary member 10K is made of metal having a hardness lower than that of the first metal member 1K. For example, the auxiliary member 10K is made of an aluminum alloy expansible member such as JIS A1050, A1100, A6063. The auxiliary member 10K is formed of an elongated member having a rectangular cross section.

The auxiliary member 10K is provided with a front face 10Ka, side faces 10Kb, 10Kc, and a back face 10Kd. The side faces 10Kb, 10Kc are orthogonal to the front face 10Ka and the back face 10Kd. The side faces 10Kb, 10Kc are parallel with each other.

Figure 23:
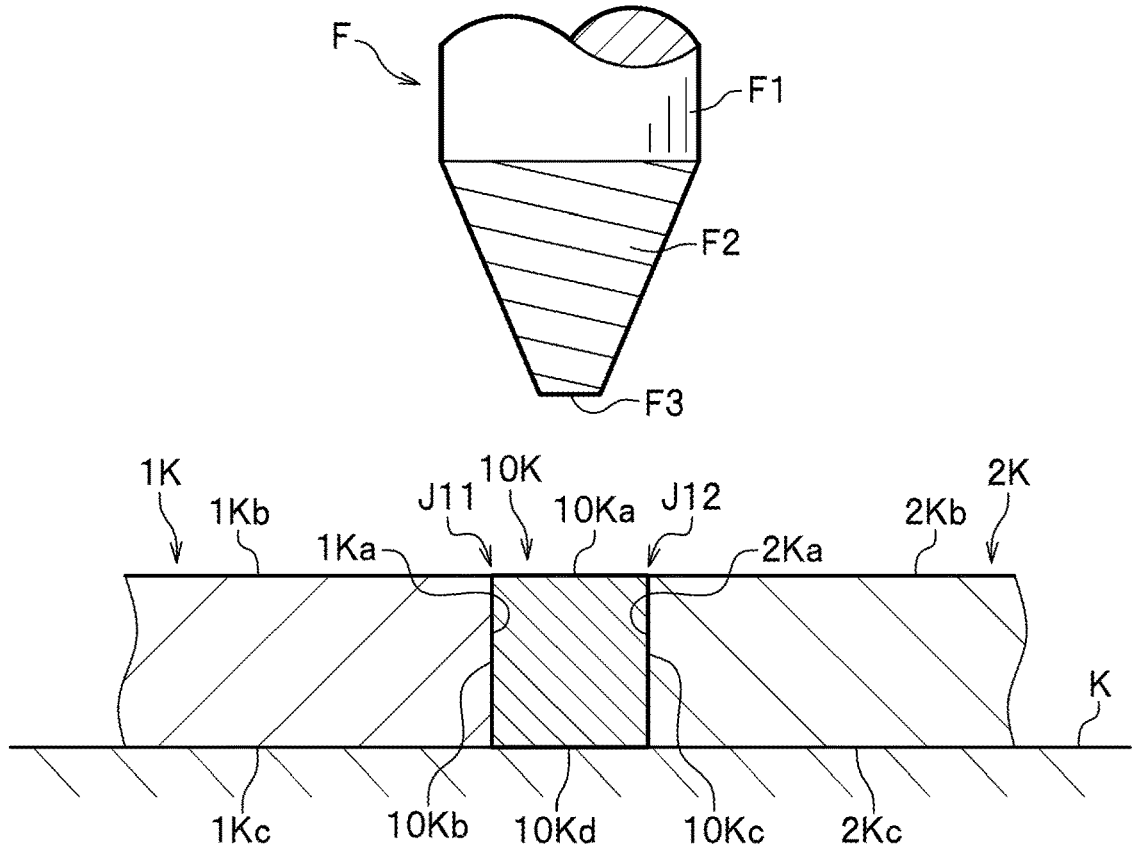
FIG. 23 is a cross sectional view showing a butting process of the joining method according to the eleventh embodiment.

As shown in FIG. 23, the butting process is a process in which the first metal member 1K, the second metal member 2K, and the auxiliary member 10K are butted against one another and fixed to the base frame K. In the butting process, the auxiliary member 10K is disposed between the end face 1Ka of the first metal member 1K and the end face 2Ka of the second metal member 2K. Abutted portion J11 is formed by butting the end face 1Ka of the first metal member 1K against the side face 10Kb of the auxiliary member 10K in a state where they are brought into almost face-to-face contact with each other. A butted portion J12 is formed by butting the end face 2Ka of the second metal member 2K against the side face 10Kc of the auxiliary member 10K in a state where they are in almost face-to-face contact with each other. The front face 10Ka of the auxiliary member 10K is flush with the front face 1Kb of the first metal member 1K and the front face 2Kb of the second metal member 2K. The back face 10Kd of the auxiliary member 10K is flush with the back face 1Kc of the first metal member 1K and the back face 2Kc of the second metal member 2K.

Here, as shown in FIG. 23, the rotary tool F is composed of the base portion F1 and the stirring pin F2. The flat face F3 is formed to have a diameter smaller than a width of the front face 10Ka of the auxiliary member 10K. A diameter of the upper end portion of the stirring pin F2 is larger than a width of the front face 10Ka of the auxiliary member 10K.

A spiral groove is formed on the outer circumferential face of the stirring pin F2. In this embodiment, since the rotary tool f is rotated clockwise, the spiral groove is formed counterclockwise from the base end side toward the tip side. Note that, in a case where the rotary tool F is rotated counterclockwise, a spiral groove is formed clockwise from the base end side toward the tip side. In the result, since plastically fluidized metal is moved toward the tip side through the spiral groove, occurrence of burrs can be suppressed.

Figure 24:
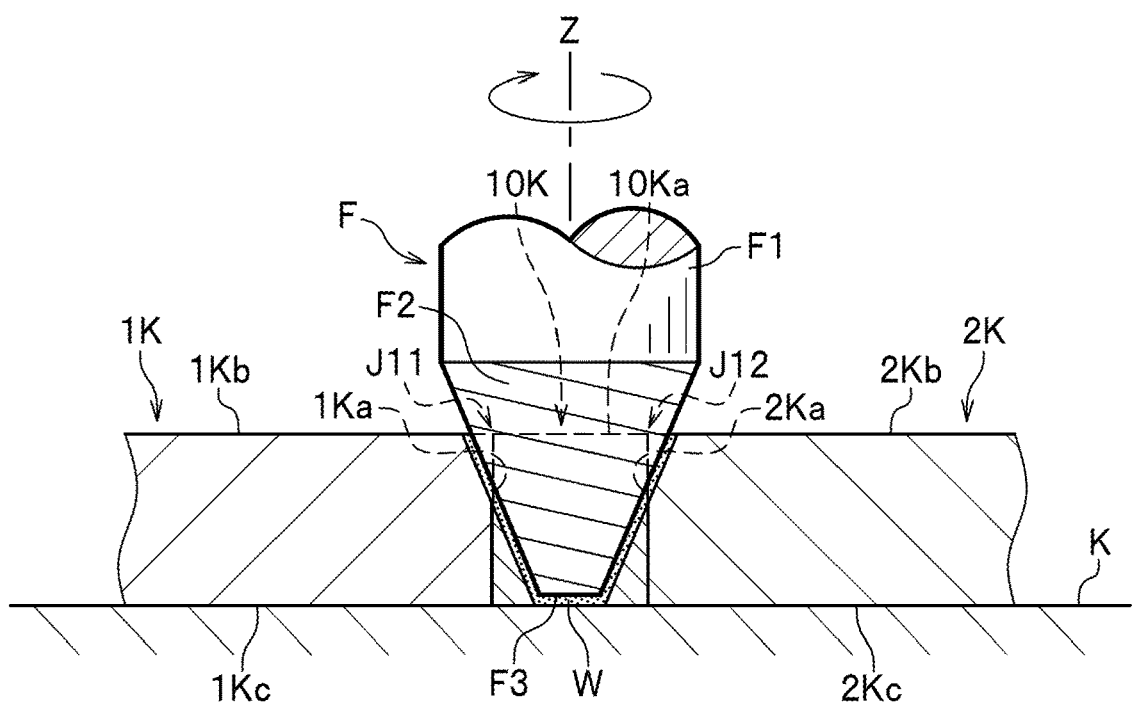
FIG. 24 is a cross sectional view showing a joining process of the joining method according to the eleventh embodiment.

As shown in FIG. 24, the joining process is a process in which friction stir welding is performed to the first metal member 1K and the second metal member 2K with use of the rotary tool F. In the joining process, the rotary tool F is moved in the longitudinal direction of the auxiliary member 10K in a state where the stirring pin F2 of the rotary tool F which is being rotated clockwise is inserted into the front face 10Ka of the auxiliary member 10K in the middle in the width of the front face 10Ka. During this time, the outer circumferential face of the lower end portion of the stirring pin F2 is not in contact with the end face 1Ka of the first metal member 1K nor the end face 2Ka of the second metal member 2K, and the outer circumferential face of the upper end portion of the stirring pin F2 is in contact with an upper end portion of the end face 1Ka of the first metal member 1K and an upper end portion of the end face 2Ka of the second metal member 2K. The outer circumferential face of the upper end portion of the stirring pin F2 is in contact in such a state that a contact dimension is larger with approaching the corresponding upper end in the upper end portion of the end face 1Ka of the first metal member 1K and in the upper end portion of the end face 2Ka of the second metal member 2K.

In the joining process, friction stirring is performed in a state where only the stirring pin F2 is brought into contact with the first metal member 1K, the second metal member 2K, and the auxiliary member 10K and the base end side of the stirring pin F2 is exposed from the first metal member 1K and the second metal member 2K. The flat face F3 of the stirring pin F2 is inserted into a deep position as far as it does not reach the base frame K. After the rotary tool F is moved along the auxiliary member 10K and reaches an end position, the rotary tool F is removed from the auxiliary member 10K. By the manner described in the above, the butted portions J11 and J12 are friction stir welded simultaneously by one process. A plasticized region W is formed along the moving track of the rotary tool F.

According to the joining method according to this embodiment described in the above, since the rotary tool F equipped with the stirring pin F2 having a smaller diameter toward the tip is used, it can be easily inserted into the front face 10Ka of the auxiliary member 10K. Further, friction stirring is performed in a state where only the stirring pin F2 is inserted into the auxiliary member 10K and the base end side of the stirring pin F2 is exposed, the load acting on a friction stir device can be reduced.

Furthermore, since the rotary tool F is inserted into the auxiliary member 10K having a hardness lower than those of the first metal member 1K and the second metal member 2K, a life of the rotary tool F can be prolonged. And further, since only the upper end portion of the stirring pin F2 is just brought into contact with the first metal member 1K and the second metal member 2K, the harder metal of the first metal member 1K and the second metal member 2K can be prevented from being much mixed into the auxiliary member 10K side. Therefore, the joining strength can be more enhanced.

Since the stirring pin F2 has a shape of a smaller diameter with approaching the tip thereof, the stirring pin F2 can be prevented from being largely brought into contact with the first metal member 1K and the second metal member 2K.

Twelfth Embodiment

Figure 25:
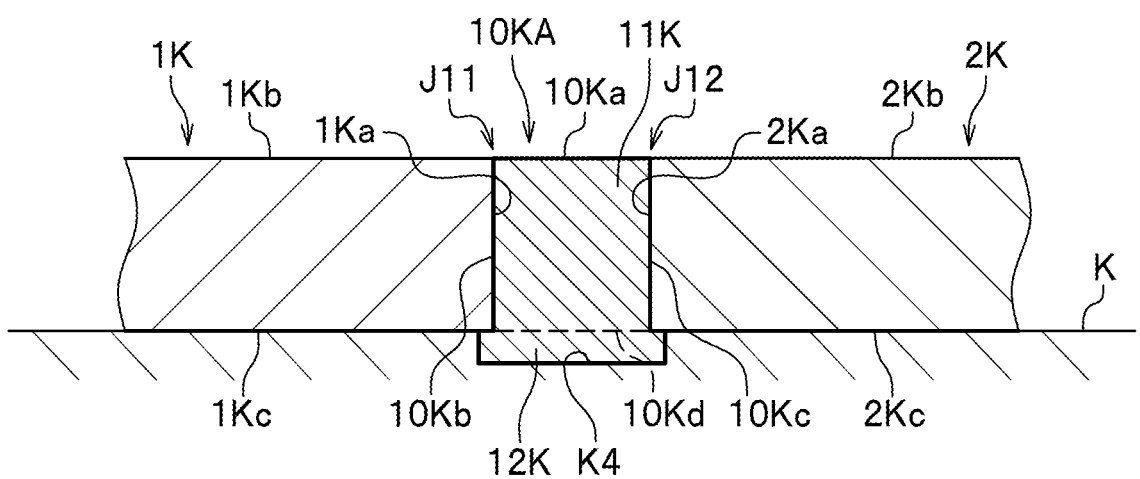
FIG. 25 is a cross sectional view showing a butting process of a joining method according to a twelfth embodiment of the present invention.

Next, a joining method according to a twelfth embodiment of the present invention will be described. FIG. 25 is a cross sectional view showing a butting process of the joining method according to the twelfth embodiment of the present invention. In the joining method according to the twelfth embodiment, a preparation process, the butting process, and a joining process are performed. In the twelfth embodiment, a shape of an auxiliary member 10KA mainly differs from that of the eleventh embodiment. In this embodiment, matters different from those of the eleventh embodiment will be mainly described.

As shown in FIG. 25, a first metal member 1K and a second metal member 2K are the same as those of the eleventh embodiment. The auxiliary member 10KA is provided with a body portion 11K having a rectangular cross section and a protruding portion 12K protruding downward from a back face (bottom) 10Kd of the body portion 11K. The protruding portion 12K has a rectangular cross section (laterally long rectangular) wider than the back face (bottom) 10Kd of the body portion 11K. The protruding portion 12K is formed along the entire length of the auxiliary member 10KA in the longitudinal direction. Note that, the protruding portion 12k may be formed intermittently in the longitudinal direction of the auxiliary member 10KA. The base frame K has a recessed portion K4 having a rectangular cross section into which the protruding portion 12k is inserted.

In the butting process, the first metal member 1K, the second metal member 2K, and the auxiliary member 10KA are butted against one another and fixed to the base frame K. In the butting process, at first, the protruding portion 12K of the auxiliary member 10KA is inserted into the recessed portion K4. For example, the protruding portion 12K is inserted from an opening portion on the anterior side or the posterior side of the recessed portion K4 of the base frame K.

Next, the first metal member 1K and the second metal member 2K are butted against the auxiliary member 10K from respective sides of the auxiliary member 10K. The protruding portion 12K is engaged with both a back face 1Kc of the first metal member 1K and a back face 2Kc of the second metal member 2K. Abutted portion J11 is formed by butting an end face 1Ka of the first metal member 1K against a side face 10Kb of the auxiliary member 10KA. A butted portion J12 is formed by butting an end face 2Ka of the second metal member 2K against a side face 10Kc of the auxiliary member 10KA.

In the joining process, friction stir welding is performed to the butted portions J11, J12 with use of the rotary tool F. In this embodiment, friction stir welding is performed in the same manner as that of the eleventh embodiment. Note that, after the joining process is finished, a cutting process to cut the protruding portion 12K may be performed, or the protruding portion 12K may be left.

Also according to the twelfth embodiment described in the above, almost the same effect as that of the eleventh embodiment can be achieved. For example, the longer the joint length due to friction stir welding is, the longer length the auxiliary member 10KA is formed to have. When friction stir welding is performed in such a case, there is a problem that the auxiliary member 10KA is floated upward. However, according to the twelfth embodiment, the auxiliary member 10KA can be prevented from being floated since the auxiliary member 10KA is provided with the protruding portion 12K. Hereby, the position of the auxiliary member 10KA with respect to the first metal member 1K and the second metal member 2K is prevented from shifting, so that friction stir welding can be more suitably performed.

Note that, in this embodiment, the protruding portion 12K is set to engage with both the first metal member 1K and the second metal member 2K, but may be set to engage with either one of the first metal member 1K and the second metal member 2K so that the auxiliary member 10KA is not floated.

Thirteenth Embodiment

Figure 26:
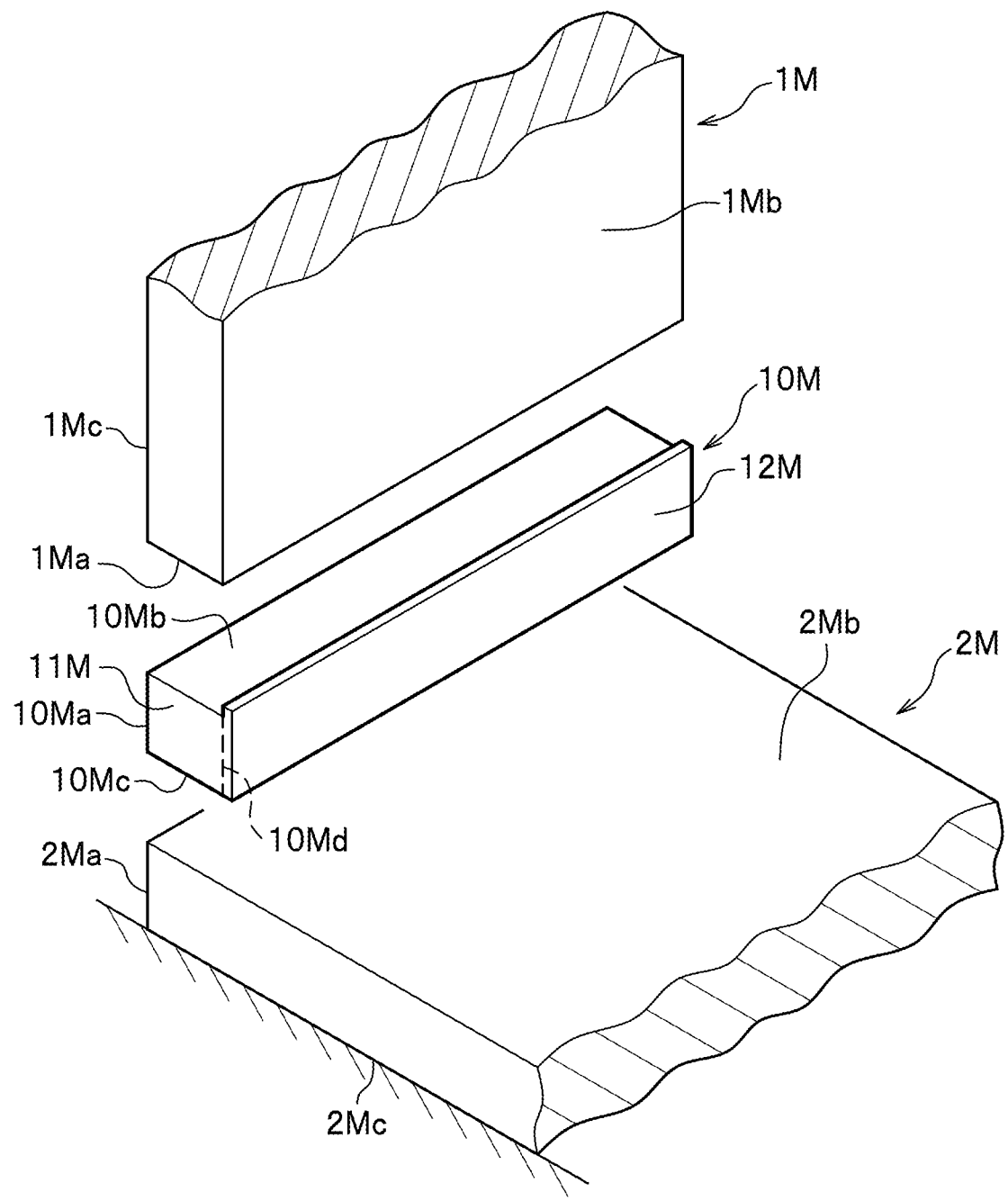
FIG. 26 is a perspective view showing a preparation process of a joining method according to a thirteenth embodiment of the present invention.

Next, a joining method according to a thirteenth embodiment of the present invention will be described. FIG. 26 is a perspective view showing a preparation process of the joining method according to the thirteenth embodiment of the present invention. As shown in FIG. 26, the thirteenth embodiment differs from the other embodiments in that a first metal member 1M and a second metal member 2M are joined orthogonally to each other.

In the joining method according to the thirteenth embodiment, a preparation process, a butting process, and a joining process are performed. In the preparation process, a first metal member 1M, a second metal member 2M, and an auxiliary member 10M are prepared. The first metal member 1M has a plate-like shape, and is provided with an end face 1Ma and side faces 1Mb, 1Mc. The side faces 1Mb, 1Mc extend in an upper-lower direction, and the end face 1Ma is orthogonal to the side faces 1Mb, 1Mc. The second metal member 2M has a plate-like shape, and is provided with an end face 2Ma and side faces 2Mb, 2Mc (upper and lower faces in FIG. 26). The end face 2Ma extends in the upper-lower direction, and the side faces 2Mb, 2Mc are horizontal. The first metal member 1M and the second metal member 2M are butted against each other in an L-shape.

The auxiliary member 10M is provided with a body portion 11M having a rectangular cross section and a protruding portion 12M protruding upward from a back face (a face on the inner corner side of the L-shaped) 10Md of the body portion 11M. The body portion 11M is provided with a front face 10Ma, side faces 10Mb, 10Mc (upper and lower faces in FIG. 26), and the back face 10Md. The protruding portion 12M has a rectangular cross section (a rectangle long in the longitudinal direction) which is wider than the back face 10Md of the body portion 11M toward the top. The protruding portion 12M is formed along the entire length of the auxiliary member 10M in the longitudinal direction. Note that, the protruding portion 12M may be formed intermittently in the longitudinal direction of the auxiliary member 10M.

Figure 27:
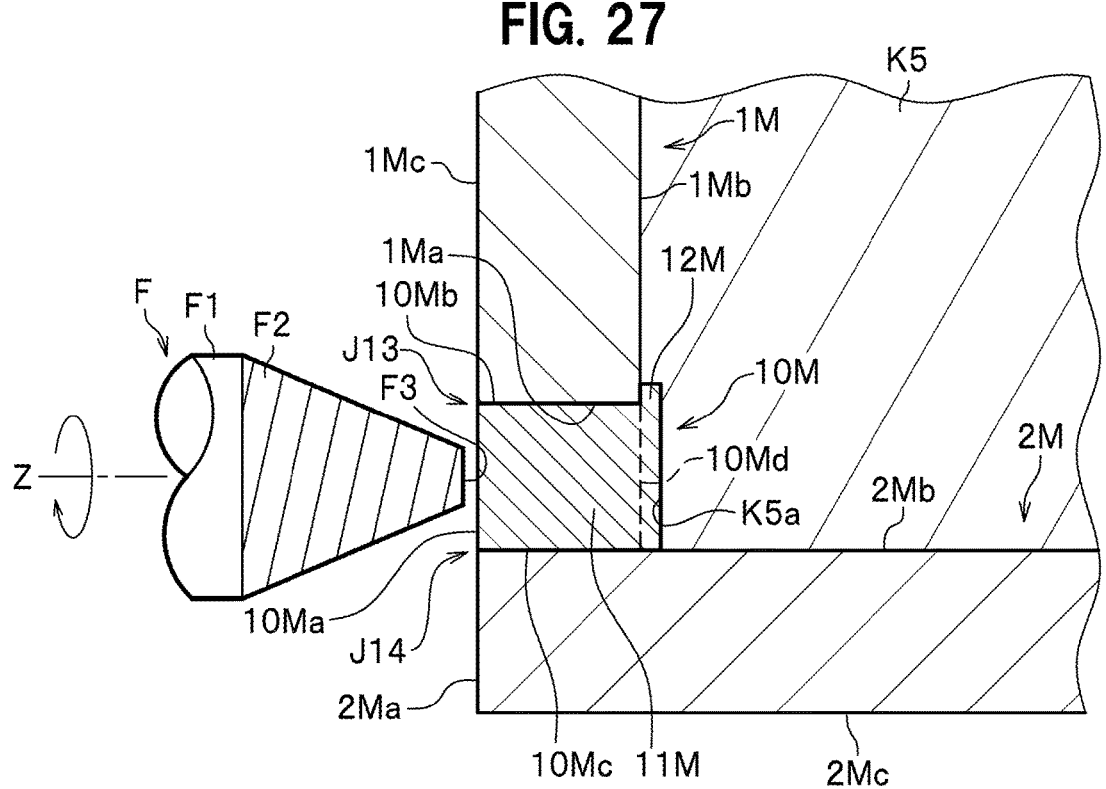
FIG. 27 is a cross sectional view showing a butting process of the joining method according to the thirteenth embodiment.

As shown in FIG. 27, the butting process is a process in which the auxiliary member 10M is interposed between the first metal member 1M and the second metal member 2M, and the first metal member 1M and the second metal member 2M are butted orthogonally (in an L-shape) against each other. In this embodiment, a base frame K5 is disposed on the inner corner side formed by the first metal member 1M and the second metal member 2M, and both members are butted. A recessed portion K5a having a rectangular cross section, into which the protruding portion 12M is inserted, is formed on the base frame K5. The recessed portion K5a is extended in the longitudinal direction of the auxiliary member 10M. In the butting process, at first, the protruding portion 12M of the auxiliary member 10M is inserted into the recessed portion K5a.

Next, the first metal member 1M and the second metal member 2M are butted against each other from respective sides of the auxiliary member 10M to be in the L-shape. The protruding portion 12M is engaged with the side face 1Mb of the first metal member 1M. A butted portion J13 is formed by butting the end face 1Ma of the first metal member 1M against the side face 10Mb of the auxiliary member 10M. A butted portion J14 is formed by butting the side face 2Mb of the second metal member 2M against the side face 10Mc of the auxiliary member 10M. The first metal member 1M and the second metal member 2M are orthogonal to each other.

Figure 28:
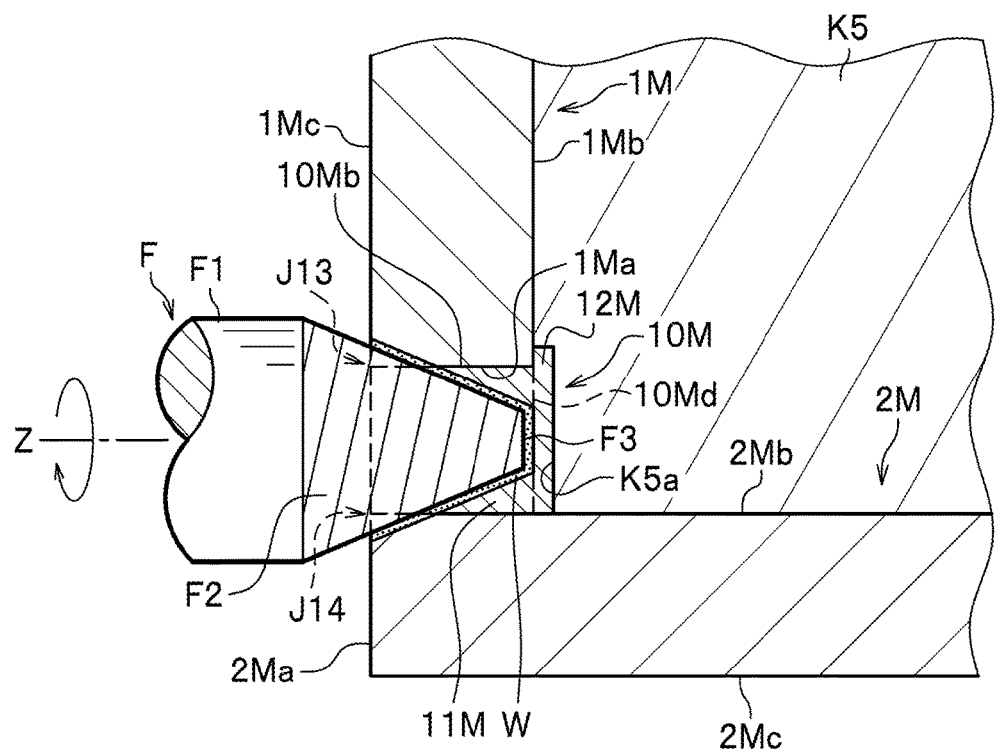
FIG. 28 is a cross sectional view showing a joining process of the joining method according to the thirteenth embodiment.

As shown in FIGS. 27, 28, the joining process is a process in which friction stir welding is performed to the butted portions J13, J14 with use of the rotary tool F. In the joining process, friction stir welding is performed to the butted portions J13, J14 by moving the rotary tool F along the auxiliary member 10M in a state where only the stirring pin F2 of the rotary tool F is inserted into the front face 10Ma of the auxiliary member 10M and a portion of the base end side of the stirring pin F2 is exposed.

Further, in this embodiment, the stirring pin F2 is moved along the longitudinal direction of the auxiliary member 10M in a state where the rotational axis Z of the stirring pin F2 is oriented in a horizontal direction and the stirring pin F2 is inserted into a width direction middle portion of the front face 10Ma of the auxiliary member 10M. In this case, the outer circumferential face of a tip portion of the stirring pin F2 is not brought into contact with the end face 1Ma of the first metal member 1M nor the side face 2Mb of the second metal member 2M, and the outer circumferential face of a base end portion of the stirring pin F2 is brought into contact with the end face 1Ma of the first metal member 1M and the side face 2Mb of the second metal member 2M. The outer circumferential face of the base end portion of the stirring pin F2 is in contact with the end face 1Ma of the first metal member 1M and the side face 2Mb of the second metal member 2M in such a manner that contacting dimensions become larger as approaching the base end side.

In the joining process, friction stirring is performed in a state where only the stirring pin F2 is brought into contact with the first metal member 1M, the second metal member 2M, and the auxiliary member 10M, and the base end side of the stirring pin F2 is exposed from the first metal member 1M and the second metal member 2M. The flat face F3 of the stirring pin F2 is inserted into a deep position as far as it does not reach the base frame K5. After the rotary tool F is moved along the auxiliary member 10M and reaches an end position, the rotary tool F is removed from the auxiliary member 10M. By the method described in the above, the butted portions J13, J14 are friction stir welded simultaneously by one process. A plasticized region W is formed along the moving track of the rotary tool F. Note that, after the joining process is finished, a cutting process to cut the protruding portion 12M may be performed, or the protruding portion 12M may be left. Further, in this embodiment, an auxiliary member without the protruding portion 12M may be used.

Also according to the joining method according to the thirteenth embodiment described in the above, almost the same effect as that of the eleventh embodiment can be obtained. Further, in this embodiment, the first metal member 1M and the second metal member 2M can be joined orthogonally to each other. And further, the auxiliary member 10M can be prevented from being floated, so that the position of the auxiliary member 10M with respect to the first metal member 1M and the second metal member 2M can be prevented from shifting. In the conclusion, friction stir welding can be more suitably performed.

Fourteenth Embodiment

Figure 29:
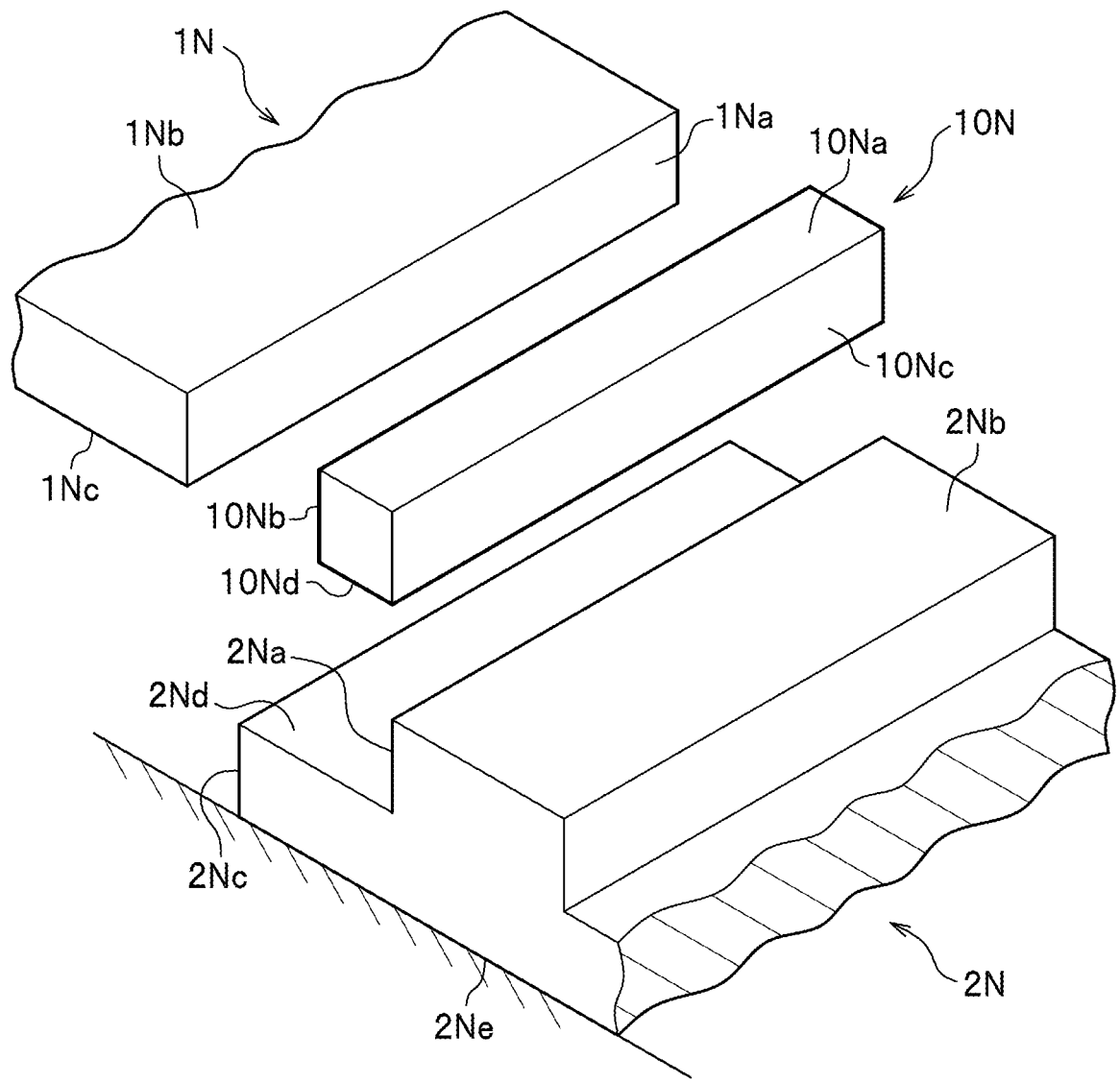
FIG. 29 is a perspective view showing a preparation process of a joining method according to a fourteenth embodiment of the present invention.

Next, a joining method according to a fourteenth embodiment of the present invention will be described. FIG. 29 is a perspective view showing a preparation process of the joining method according to the fourteenth embodiment of the present invention. As shown in FIG. 29, the fourteenth embodiment differs from the other embodiments in that a first metal member 1N and a second metal member 2N are butted against each other while they are overlapped with each other.

In the joining method according to the fourteenth embodiment, the preparation process, a butting process, and a joining process are performed. In the preparation process, the first metal member 1N, the second metal member 2N, and an auxiliary member 10N are prepared. The first metal member 1N has a plate-like shape and is provided with an end face 1Na, a front face 1Nb, and a back face 1Nc. The end face 1Na is orthogonal to the front face 1Nb and the back face 1Nc.

The second metal member 2N is formed to have a stepped portion composed of a thick plate portion and a thin plate portion. The second metal member 2N has a first end face 2Na, a first front face 2Nb, a second end face 2Nc, a second front face 2Nd, and a back face 2Ne. The first end face 2Na is orthogonal to the first front face 2Nb. The second end face 2Nc is orthogonal to the second front face 2Nd and the back face 2Ne.

The auxiliary member 10N is formed of an elongated member having a rectangular cross section. The auxiliary member 10N is provided with a front face 10Na, side faces 10Nb, 10Nc, and a back face 10Nd. Each of the side faces 10Nb, 10Nc is orthogonal to the front face 10Na and the back face 10Nd. The side faces 10Nb, 10Nc are parallel with each other.

Figure 30:
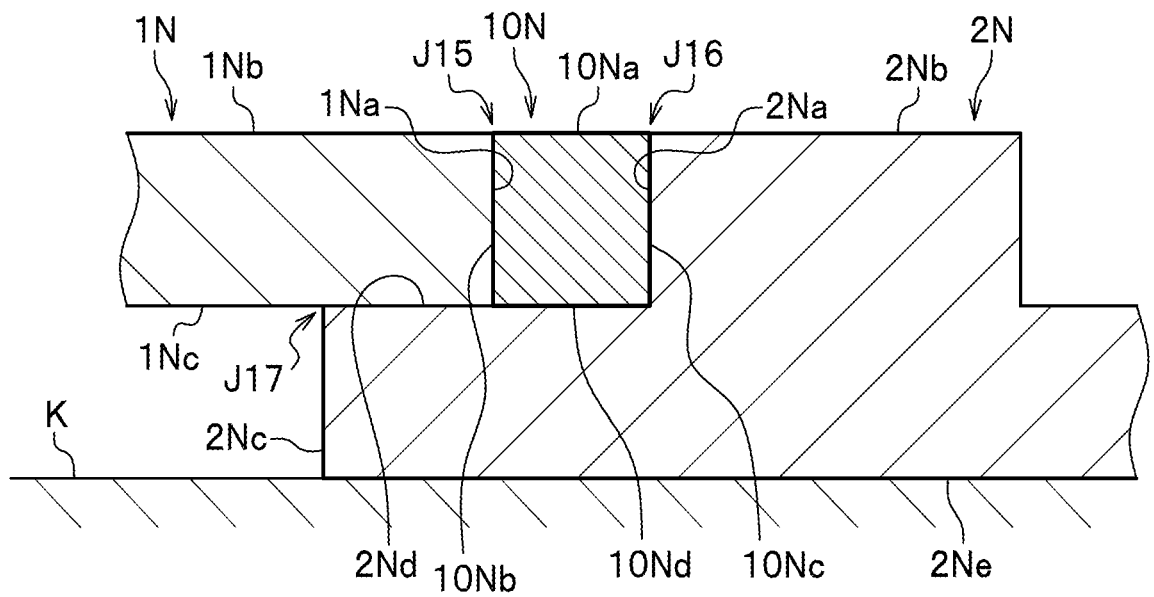
FIG. 30 is a cross sectional view showing a butting process of the joining method according to the fourteenth embodiment.

As shown in FIG. 30, the butting process is a process in which the first metal member 1N and the second metal member 2N are butted against each other with the auxiliary member 10N therebetween while they are overlapped with each other. In the butting process, abutted portion J17 is formed by overlapping the back face 1Nc of the first metal member 1N and the second front face 2Nd of the second metal member 2N with each other. Furthermore, a butted portion J15 is formed by butting the side face 10Nb of the auxiliary member 10N against the end face 1Na of the first metal member 1N. And further, a butted portion J16 is formed by butting the side face 10Nc of the auxiliary member 10N against the first end face 2Na of the second metal member 2N.

Figure 31:
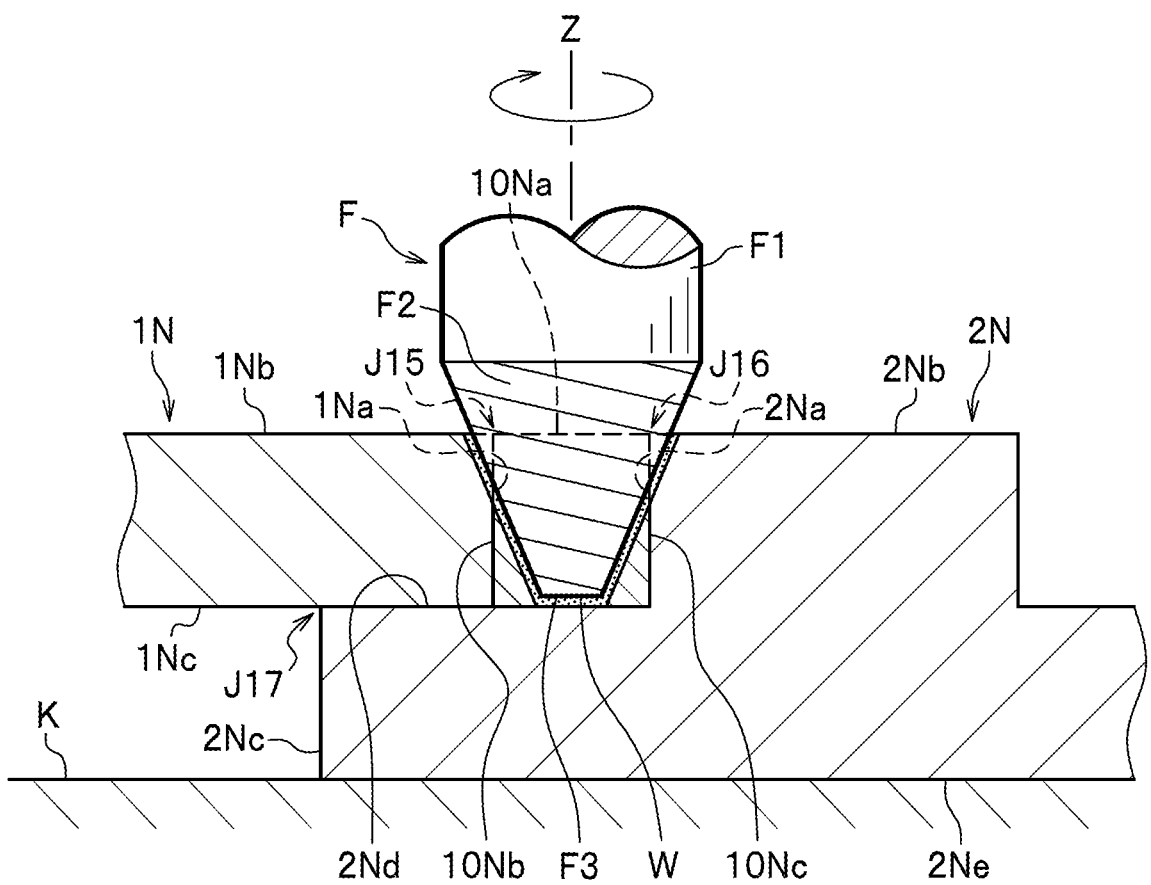
FIG. 31 is a cross sectional view showing a joining process of the joining method according to the fourteenth embodiment.

As shown in FIG. 31, the joining process is a process in which friction stir welding is performed to the first metal member 1N and the second metal member 2N with use of the rotary tool F. In the joining process, the stirring pin F2 of the rotary tool F which is being rotated clockwise is inserted into the front face 10Na of the auxiliary member 10N in the middle in the width direction of the front face 10Na. In the joining process of this embodiment, the stirring pin F2 is moved along the auxiliary member 10N in a state where the outer circumferential face of a lower end portion of the stirring pin F2 is not in contact with the end face 1Na of the first metal member 1N nor the first end face 2Na of the second metal member 2N, and the outer circumferential face of an upper end portion of the stirring pin F2 is in contact with the end face 1Na of the first metal member 1N and the first end face 2Na of the second metal member 2N.

In the joining process, friction stirring is performed in a state where only the stirring pin F2 is in contact with the first metal member 1N, the second metal member 2N, and the auxiliary member 10N, and a base end side of the stirring pin F2 is exposed from the first metal member 1N and the second metal member 2N. The flat face F3 of the stirring pin F2 is inserted into a deep position as far as it does not reach the second front face 2Nd of the second metal member 2N. After the rotary tool F is moved along the auxiliary member 10N and reaches an end position, the rotary tool F is removed from the auxiliary member 10N. By the method described in the above, the butted portions J15, J16 are friction stir welded simultaneously by one process. A plasticized region W is formed along the moving track of the rotary tool F.

Also according to the fourteenth embodiment described in the above, almost the same effect as that of the eleventh embodiment can be achieved.

Fifteenth Embodiment

Figure 32:
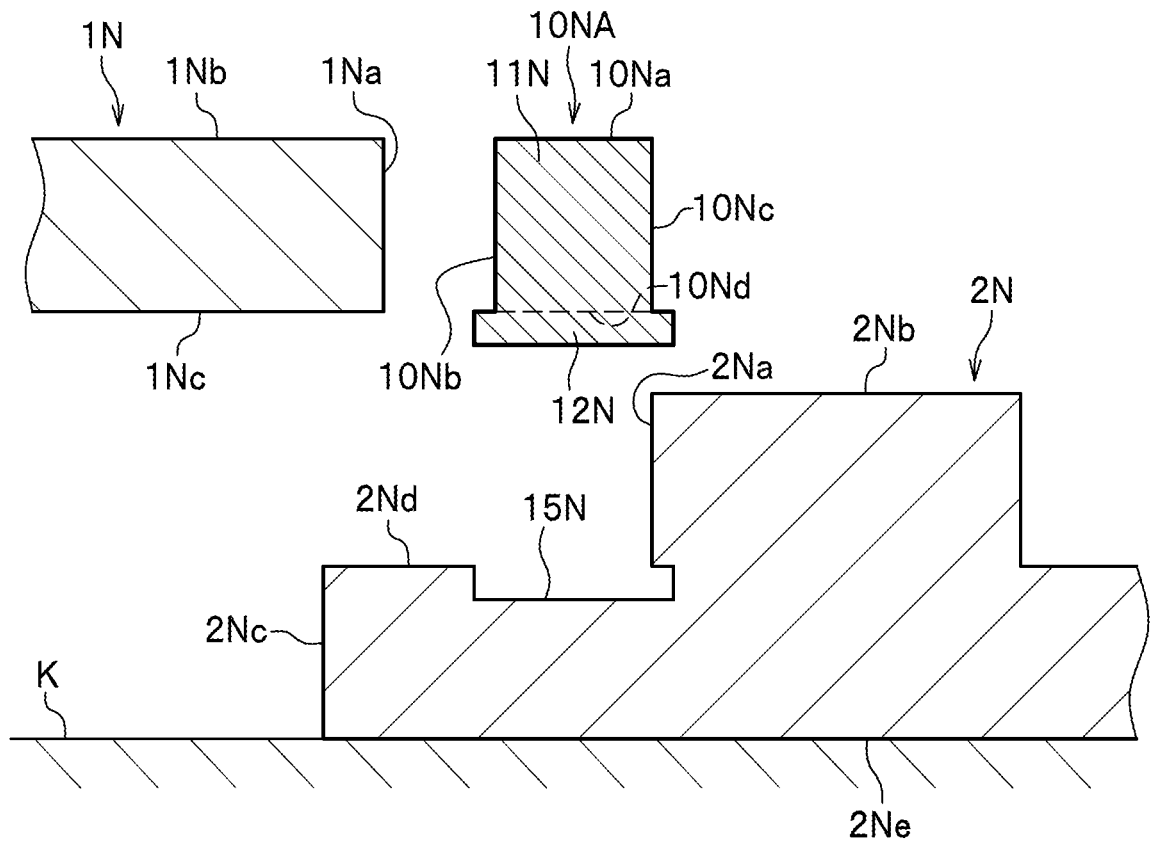
FIG. 32 is a cross sectional view showing a preparation process of a joining method according to a fifteenth embodiment of the present invention.

Next, a joining method according to a fifteenth embodiment of the present invention will be described. FIG. 32 is a cross sectional view showing a preparation process of the joining method according to the fifteenth embodiment of the present invention. In the joining method according to the fifteenth embodiment, the preparation process, a butting process, and a joining process are performed. The fifteenth embodiment mainly differs from the fourteenth embodiment in a shape of an auxiliary member 10NA. In this embodiment, matters different from those of the fourteenth embodiment will be mainly described.

As shown in FIG. 32, a first metal member 1N is the same as that of the fourteenth embodiment. A second metal member 2N has a recessed groove 15N formed on a second front face 2Nd thereof. The recessed groove 15N has a rectangular cross section.

The auxiliary member 10NA is provided with a body portion 11N having a rectangular cross section, and a protruding portion 12N protruding from a back face (bottom) 10Nd of the body portion 11N. The protruding portion 12N has a rectangular cross section (laterally wide rectangle) wider than a back face (bottom) 10Nd of the body portion 11N. The protruding portion 12N is formed along the entire length of the auxiliary member 10NA in the longitudinal direction thereof. Note that, the protruding portion 12N may be formed intermittently in the longitudinal direction of the auxiliary member 10NA. The protruding portion 12N is inserted into the recessed groove 15N of the second metal member 2N.

Figure 33:
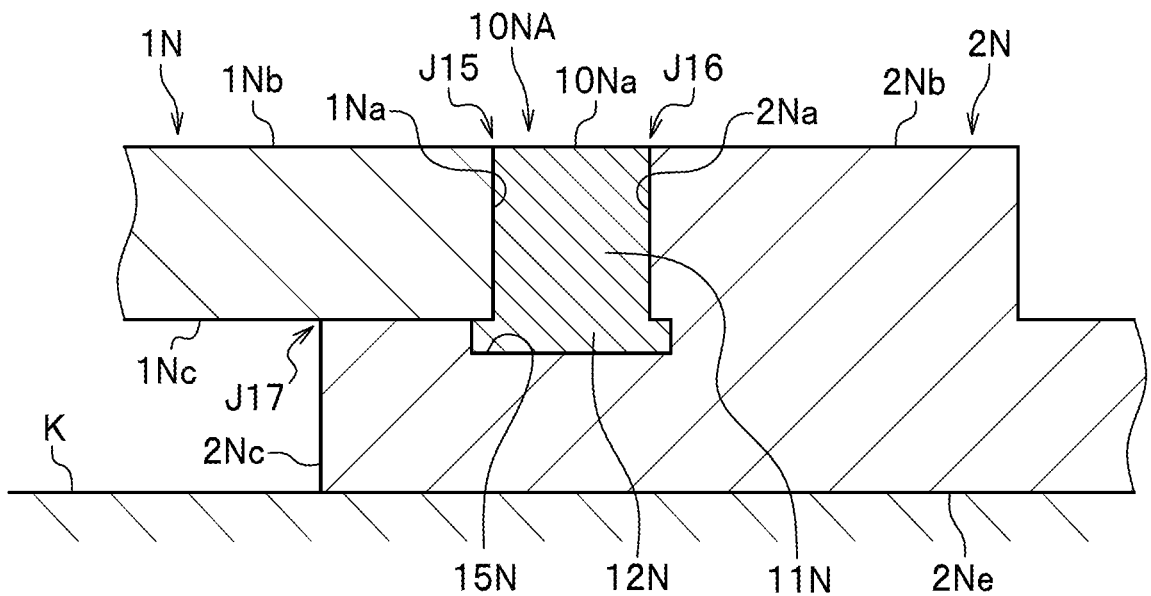
FIG. 33 is a cross sectional view showing a butting process of the joining method according to the fifteenth embodiment.

As shown in FIG. 33, in the butting process, the first metal member 1N, second metal member 2N, and the auxiliary member 10NA are butted against one another and fixed to the base frame K. In the butting process, at first, the protruding portion 12N of the auxiliary member 10NA is inserted into the recessed groove 15N. For example, the protruding portion 12N is inserted from an opening portion on the anterior side or the posterior side of the recessed groove 15N. Next, the butted portions J15, J16, J17 are formed by butting the members against one another in the same manner as that of the fourteenth embodiment. The joining process is the same as that of the fourteenth embodiment.

Also according to the fifteenth embodiment described in the above, almost the same effect as that of the fourteenth embodiment can be achieved. Furthermore, by providing the protruding portion 12N, the auxiliary member 10NA can be prevented from being floated.

In the above, the embodiments of the present invention have been described, but, appropriate design changes can be made within a range consistent with the object of the present invention. For example, in the joining processes according to the twelfth to fifteenth embodiments, the outer circumferential face of the upper end portion (base end portion) of the stirring pin F2 is brought into contact with a first metal member and a second metal member, however, is not limited to this. So long as a plasticized region reaches the first metal member and the second metal member, friction stir welding may be performed in a state where the stirring pin F2 of the rotary tool F is not brought into contact with the first metal member nor the second metal member.

REFERENCE SIGNS LIST

1 First Metal Member
1a End Face (Inclined Face)
2 Second Metal Member
2a End Face (Inclined Face)
10 Auxiliary Member
12 Protruding Portion
J1 Butted Portion
J2 Butted Portion
F Rotary Tool
F2 Stirring Pin

The invention claimed is:

1. A joining method by which a pair of metal members are joined to each other with use of a rotary tool provided with a stirring pin having a smaller diameter toward a tip thereof, the method comprising:
  a preparation process in which a first metal member made of an aluminum alloy, a second metal member made of an aluminum alloy, and an auxiliary member made of aluminum or an aluminum alloy having a hardness lower than those of the first metal member and the second metal member are prepared;
  a butting process in which a butted portion is formed in such a form that an end portion of the first metal member and an end portion of the second metal member face each other, the auxiliary member is interposed in a gap formed between the end portions, an end face of the first metal member is butted against one side face of the auxiliary member, and an end face of the second metal member is butted against the other side face of the auxiliary member; and
  a joining process in which the first metal member and the second metal member are joined with the auxiliary member interposed therebetween by moving the rotary tool along the butted portion in a state where the rotary tool which is being rotated is inserted only from a front face side of the auxiliary member, only the stirring pin is in contact with the auxiliary member, a base end side of the stirring pin is exposed, and a circumferential face of the stirring pin is in contact with each of the end face of the first metal member and the end face of the second metal member, with a contact dimension of between greater than 0 mm and less than 1.0 mm,
  wherein the auxiliary member is provided with an inclined face on at least one of the one side face and the other face thereof in such a form that the auxiliary member has a smaller dimension with increasing distance from the front face thereof, and at least one of the first metal member and the second metal member is provided with an inclined face which corresponds to the inclined face of the auxiliary member and is inclined from a front face toward a back face.

2. The joining method according to claim 1,
  wherein a back face side of the auxiliary member is provided with a protruding portion to prevent from being floated, and
  wherein in the butting process, the first metal member and the second metal member are butted against each other in such a form that the protruding portion is engaged with at least one of the first metal member and the second metal member.

* * * * *